(12) United States Patent
Inayoshi

(10) Patent No.: US 11,880,532 B2
(45) Date of Patent: Jan. 23, 2024

(54) ELECTRONIC APPARATUS PERFORMING CALIBRATION PROCESS TO DEFINE RANGES OF FIRST AND SECOND AREAS IN TOUCH SENSOR

(71) Applicant: BROTHER KOGYO KABUSHIKI KAISHA, Nagoya (JP)

(72) Inventor: Yuto Inayoshi, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/818,415

(22) Filed: Aug. 9, 2022

(65) Prior Publication Data
US 2023/0064308 A1 Mar. 2, 2023

(30) Foreign Application Priority Data
Aug. 31, 2021 (JP) ................................. 2021-141184

(51) Int. Cl.
*G06F 3/041* (2006.01)
*G06F 3/044* (2006.01)
(52) U.S. Cl.
CPC ................................. *G06F 3/0418* (2013.01)
(58) Field of Classification Search
CPC ........ G06F 3/0418; G06F 3/044; G06F 3/041; G06F 3/0416; G06F 3/0426; H04N 9/3185; H04N 9/3194
See application file for complete search history.

(56) References Cited

U.S. PATENT DOCUMENTS

| 6,456,952 | B1 * | 9/2002 | Nathan | G06F 3/0418 345/173 |
| 2010/0321307 | A1 * | 12/2010 | Hirokawa | G06F 3/0418 345/173 |
| 2011/0193808 | A1 | 8/2011 | Naka | |
| 2020/0167116 | A1 * | 5/2020 | Manabe | B60K 35/00 |
| 2021/0097719 | A1 * | 4/2021 | Kulbida | G03B 21/132 |

FOREIGN PATENT DOCUMENTS

| JP | 2011164742 A | 8/2011 |
| JP | 2011197860 A | 10/2011 |

* cited by examiner

*Primary Examiner* — Md Saiful A Siddiqui
(74) *Attorney, Agent, or Firm* — Scully, Scott, Murphy & Presser, PC

(57) ABSTRACT

In an electronic apparatus, a touch sensor has a first area and a second area not overlapping with the first area. The controller performs a first calibration process to define a first coordinate range of the first area by correcting a coordinate deviation of the first area on the basis of detection of a touch operation to touch a predetermined first target portion in the first area. The controller performs a second calibration process to define a second coordinate range of the second area on the basis of the first coordinate range defined in the first calibration process and relative position information stored in a memory. When the second coordinate range defined in the second calibration process meets a predetermined condition, the controller performs a third calibration process to correct the second coordinate range to achieve that the corrected second coordinate range does not meet the predetermined condition.

17 Claims, 16 Drawing Sheets

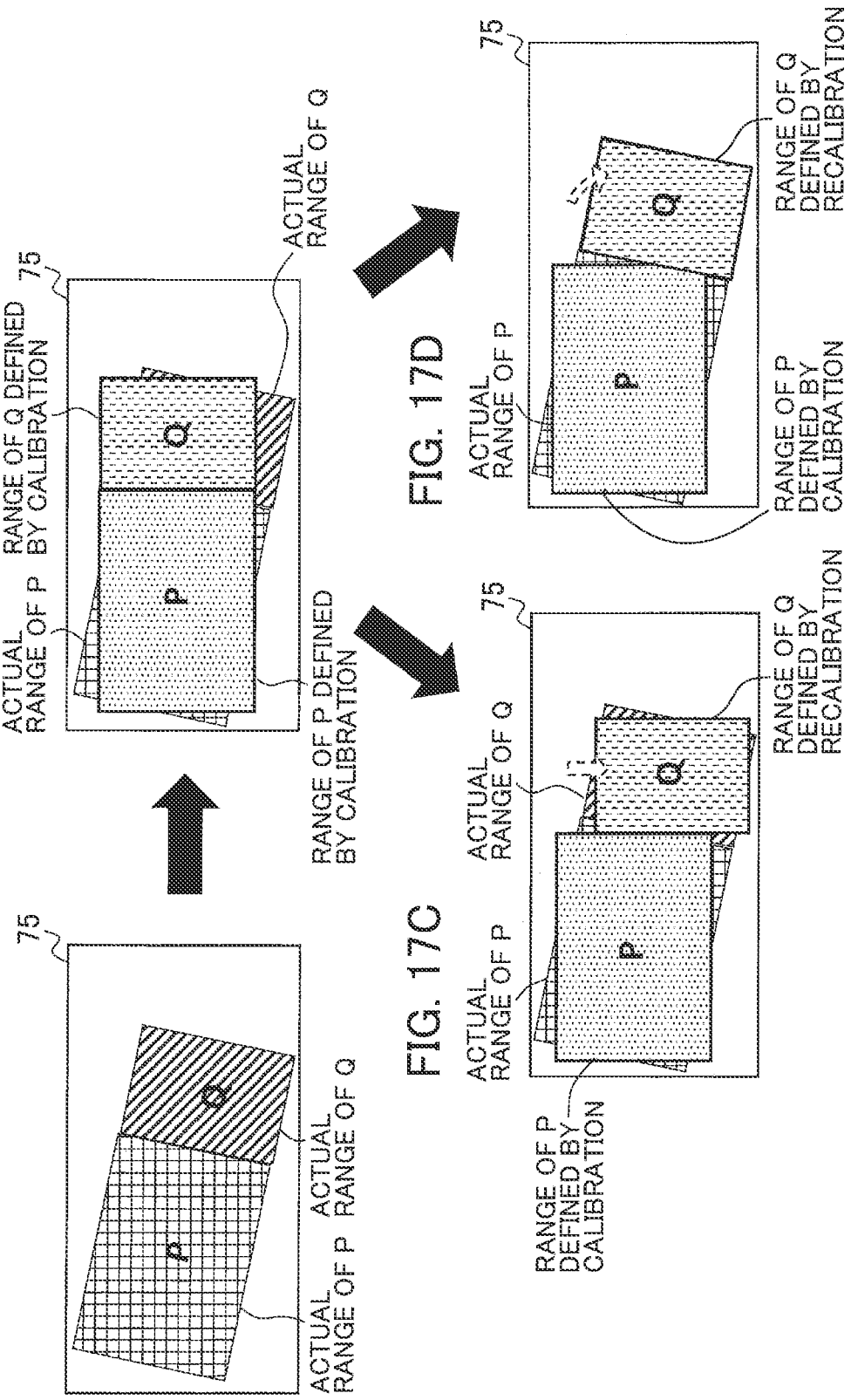

ELECTRONIC APPARATUS PERFORMING CALIBRATION PROCESS TO DEFINE RANGES OF FIRST AND SECOND AREAS IN TOUCH SENSOR

REFERENCE TO RELATED APPLICATIONS

This application claims priority from Japanese Patent Application No. 2021-141184 filed on Aug. 31, 2021. The entire content of the priority application is incorporated herein by reference.

BACKGROUND ART

There is known a display control device that calibrates a coordinate deviation between prescribed target coordinates and actually detected coordinates corresponding to a touch input for the target coordinates.

DESCRIPTION

The above display control device prompts a user to sequentially touch target marks displayed on a display to perform calibration. Thus, when there is a plurality of areas to be calibrated on a touch sensor, the user's touch operation needs to be made for each of the plurality of areas, causing the user to perform troublesome operations.

It is therefore an object of the present disclosure to provide an electronic apparatus and a display process program capable of performing calibration for a plurality of areas without causing a user to perform troublesome operations.

In order to attain the above and other object, the present disclosure provides an electronic apparatus. The electronic apparatus includes a touch sensor, a memory, and a controller. The touch sensor has a first area and a second area not overlapping with the first area. The memory stores in advance relative position information indicating a positional relation between the first area and the second area. The controller is configured perform: a first calibration process to define a first coordinate range of the first area by correcting a coordinate deviation of the first area on the basis of detection of a touch operation to touch a predetermined first target portion in the first area; a second calibration process to define a second coordinate range of the second area on the basis of the first coordinate range defined in the first calibration process and the relative position information stored in the memory; when the second coordinate range defined in the second calibration process meets a predetermined condition, a third calibration process to correct the second coordinate range to achieve that the corrected second coordinate range does not meet the predetermined condition.

According to another aspect, the disclosure provides an electronic apparatus. The electronic apparatus includes a touch sensor, a memory, and a controller. The touch sensor has a first area and a second area not overlapping with the first area. The memory stores relative position information indicating a positional relation between the first area and a second area. The controller configured perform: a storing process to store in the memory a detection coordinate of a touch operation to touch a predetermined first target portion in the first area; a first calibration process to define a first coordinate range of the first area by correcting a deviation of the detection coordinate; a second calibration process to define a second coordinate range of the second area on the basis of the detection coordinate stored in the storing process and the relative position information stored in the memory; and when the second coordinate range defined in the second calibration process meets a predetermined condition, a third calibration process to correct the second coordinate range to achieve that the corrected second coordinate range does not meet the predetermined condition.

According to another aspect, the disclosure provides a non-transitory computer readable storage medium storing a set of program instructions installed on and executed by a computer for controlling an electronic apparatus including a touch sensor having a first area and a second area not overlapping with the first area, and a memory storing in advance relative position information indicating a positional relation between the first are and the second area. The set of program instructions includes performing a first calibration process to define a first coordinate range of the first area by correcting a coordinate deviation of the first area on the basis of detection of a touch operation to touch a predetermined first target portion in the first area; performing a second calibration process to define a second coordinate range of the second area on the basis of the first coordinate range defined in the first calibration process and the relative position information stored in the memory; and when the second coordinate range defined in the second calibration process meets a predetermined condition, performing a third calibration process to correct the second coordinate range to achieve that the corrected second coordinate range does not meet the predetermined condition.

With the above structures, the calibration can be performed for a plurality of areas without requiring the user to perform troublesome operations.

FIGS. 17A-17D are explanatory diagrams illustrating the calibration for two areas on the touch sensor.

Hereinafter, embodiments of the present disclosure will be described while referring to the accompanying drawings.

First Embodiment

A first embodiment will be described while referring to FIGS. 1-11.

<Outer Appearance>

Figure 1:
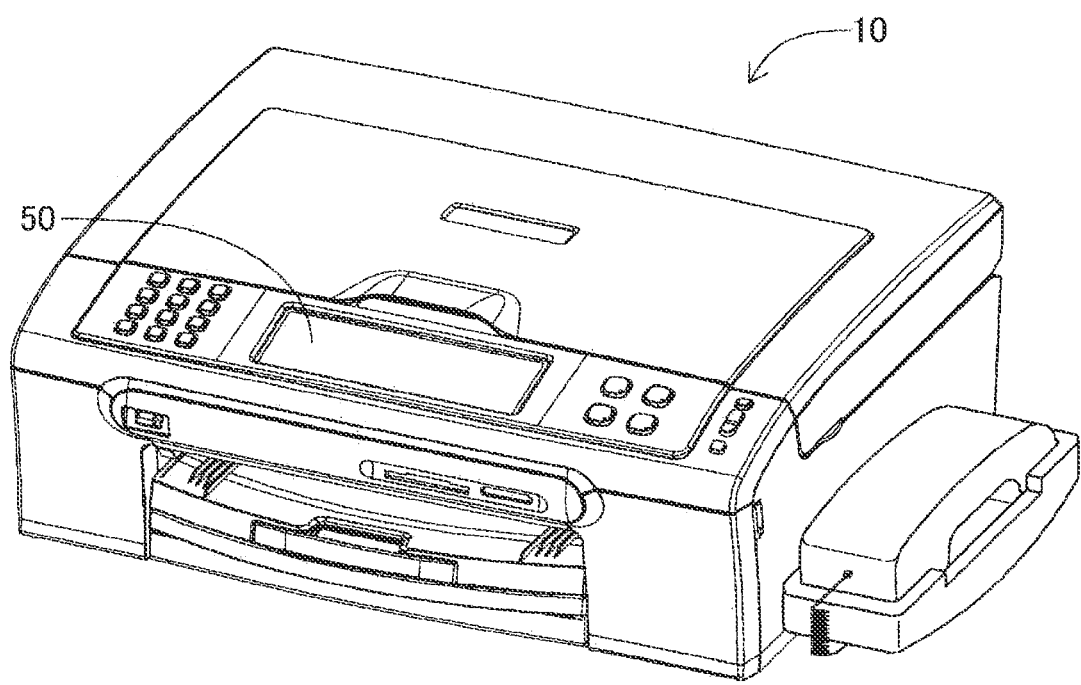
FIG. 1 is an external view of a multifunction peripheral according to an embodiment.

As illustrated in FIG. 1, a multifunction peripheral 10 has a printer function, a scanner function, a copy function, a facsimile function, a telephone function, and other functions. The multifunction peripheral 10 is an example of an electronic apparatus. As illustrated in FIG. 1, a display panel 50 is provided on the front upper surface of the multifunction peripheral 10. The display panel 50 is a panel that can detect coordinates of a position touched by a user. As will be described in detail later, various buttons such as a menu button, a telephone directory button, and a history button are displayed on the display panel 50.

<Electrical Configuration>

Figure 2:
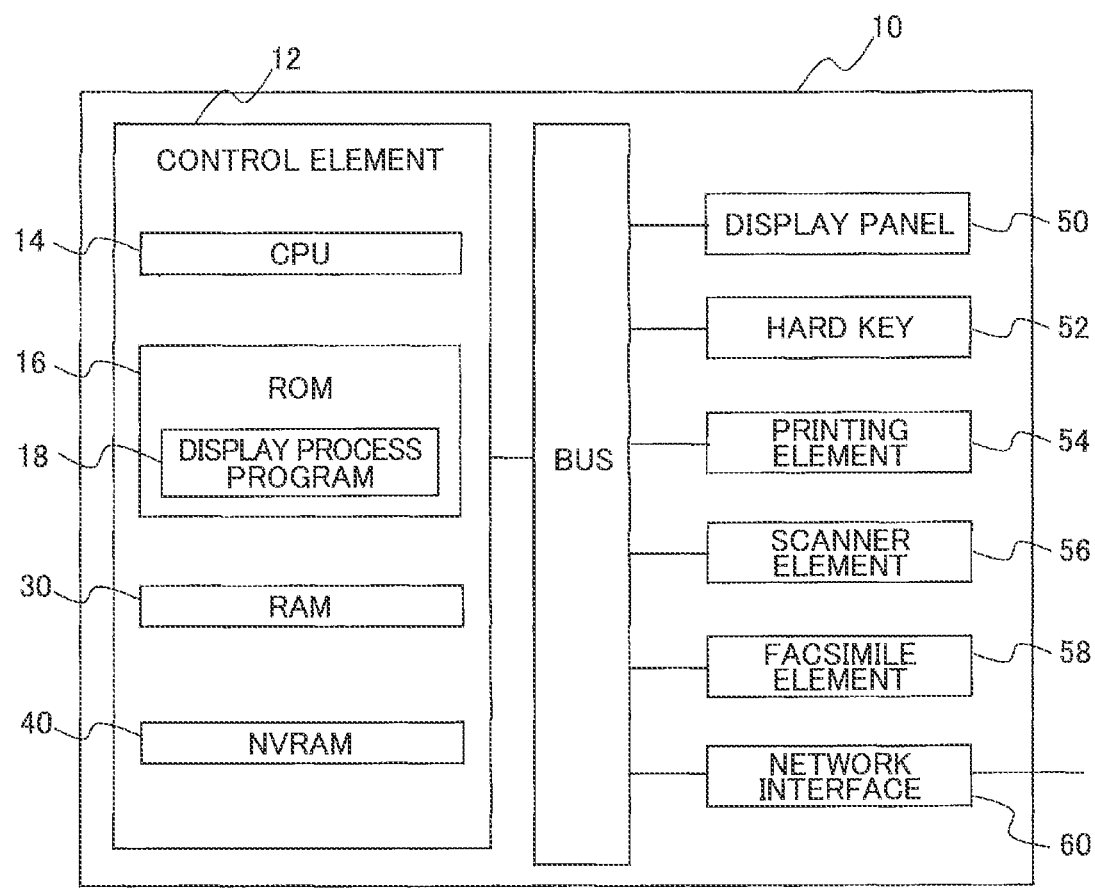
FIG. 2 is a block diagram illustrating electrical configurations of the multifunction peripheral.

As illustrated in FIG. 2, the multifunction peripheral 10 has a control element 12, the display panel 50, a hard key 52, a printing element 54, a scanner element 56, a facsimile element 58, and a network interface 60. The control element 12 includes a CPU (Central Processing Unit) 14, a ROM (Read-Only Memory) 16, a RAM (Random-Access Memory) 30, and an NVRAM (Nonvolatile Random Access Memory) 40.

The CPU 14 executes various processes according to programs stored in the ROM 16. The CPU 14 is an example of a controller. The processes executed by the CPU 14 will be described later in detail. The ROM 16 stores a basic function program for controlling the basic operation of the multifunction peripheral 10 and a display process program 18 for executing a display processing method according to the present embodiment. The display process program 18 is used for generating display data to be displayed on the display panel 50 and executing processes corresponding to a button reaction area. The display processing method according to the present embodiment will be described later.

The RAM 30 is a volatile memory having a storage area for storing various data generated in the processes executed according to the basic function program or the display process program 18. The NVRAM 40 is a nonvolatile memory having a storage area for storing various parameters, button tables, and relative position information (described later), which are used when the CPU 14 executes the processes according to the basic function program or the display process program 18. The button table is a table storing, for each of the various buttons displayed on the display panel 50, correspondence between the coordinates of the button reaction area and processing contents assigned to the button reaction area. The NVRAM 40 is an example of the memory.

The network interface 60 is connected to a LAN (Local Area Network). The multifunction peripheral 10 can communicate with an externally connected personal computer and can access the Internet.

<Display Panel>

Figure 3:
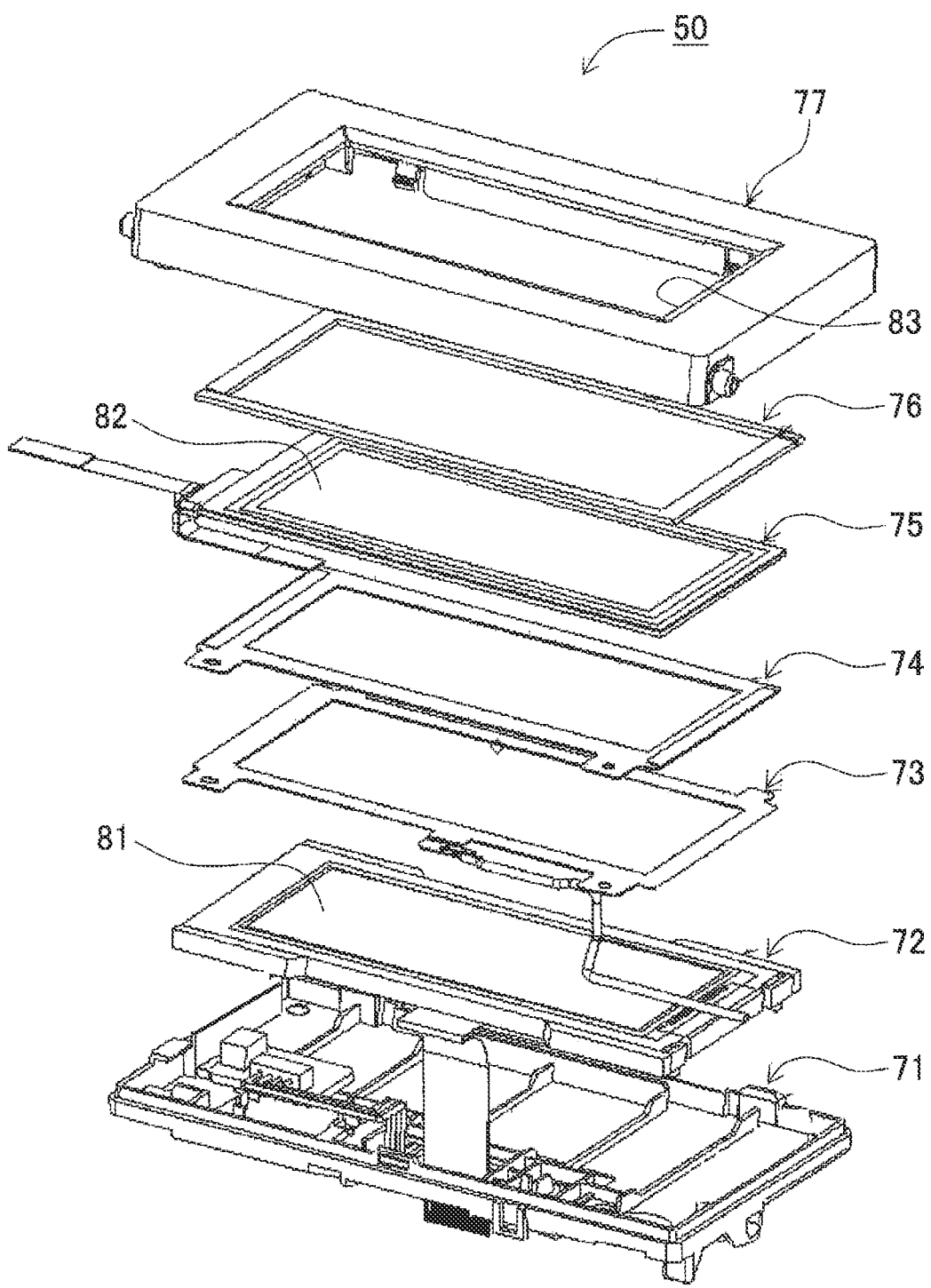
FIG. 3 is a perspective exploded view of a display panel.

The following describes the configuration of the display panel 50 using FIG. 3. The display panel 50 has an LCD lower cover 71, an LCD (Liquid Crystal Display) 72, a plate 73, a frame sheet 74, a touch sensor 75, a foamed sealing member 76, and an LCD upper cover 77.

The LCD 72 is a known liquid crystal display and an example of a display capable of displaying variable contents under known control. The LCD 72 has an image display area 81 in which characters, graphics, symbols, etc. are displayed. The LCD 72 is fixed to substantially the center of the LCD lower cover 71. The plate 73 is a metal plate member and has a role of removing static electricity. The frame sheet 74 is a sheet for hiding the edge portion of the image display area 81 of the LCD 72.

The touch sensor 75 has substantially the same size as insertion areas of the LCD lower cover 71 and the LCD upper cover 77 and is disposed to cover the LCD 72. The touch sensor 75 has a touch sensor reaction area 82 where a position touched or depressed by a user can be detected. The touch sensor reaction area 82 is an example of the touch detection area. The touch sensor 75 is transparent to allow the user to view the content displayed in the image display area 81 of the LCD 72 through the touch sensor 75. For example, a known type of the touch sensor 75 may be used such as a resistive film type, a projected capacitive type, an infrared blocking type, and an ultrasonic surface acoustic wave type.

The foamed sealing member 76 is a sponge-like member and has a role of securing sealing between the LCD upper cover 77 and the touch sensor 75 to prevent dusts from entering interior space of the display panel 50. The LCD upper cover 77 has an opening 83 allowing a user to view the image display area 81 therethrough. The size of the opening 83 is larger than that of the image display area 81.

The above-described LCD lower cover 71, the LCD 72, the plate 73, the frame sheet 74, the touch sensor 75, the foamed sealing member 76, and the LCD upper cover 77 are stacked in this order and fixed to each other, whereby the display panel 50 is completed. In the thus configured display panel 50, a user can view the image display area 81 and the touch sensor reaction area 82 through the opening 83 of the LCD upper cover 77.

<Calibration of Touch Sensor>

The calibration of the touch sensor 75 will be described.

<Reason 1 for the Necessity of Calibration>

Figure 4A:
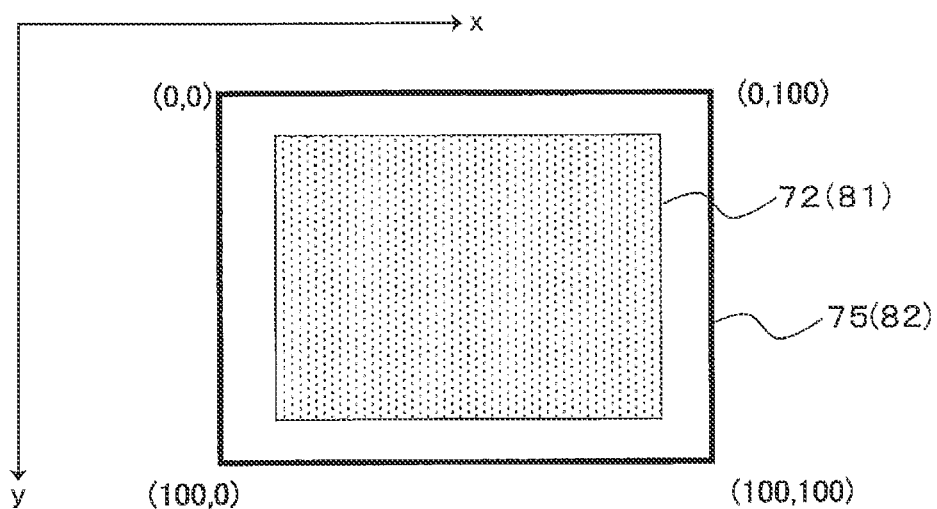
FIGS. 4A and 4B are explanatory diagrams illustrating influences of relative position between an LCD and a touch sensor set in assembly on their coordinates.
Figure 4B:
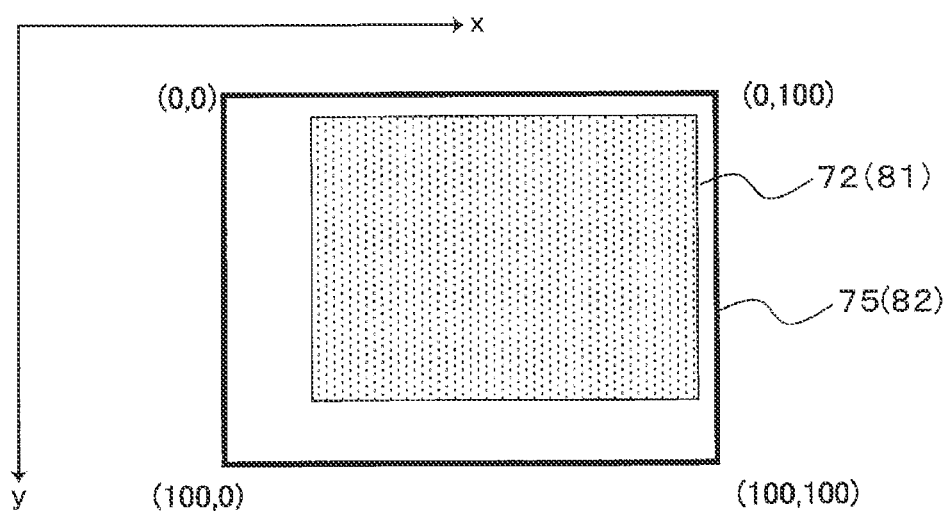

As described above, the touch sensor 75 is provided on the LCD 72 so as to visually overlap the same. At this time, the touch sensor 75, (specifically, the touch sensor reaction area 82) is larger in size than the LCD 72, (specifically, the image display area 81). As illustrated in FIG. 4A, assuming that the coordinates of the upper-left corner of the touch sensor 75 are (0, 0), and the coordinates of the lower-right corner thereof are (100, 100), coordinates (50, 50) represent the center of the touch sensor 75. However, a position on the LCD 72 specified by the coordinates (50, 50) depends on the relative positional relation between the LCD 72 and the touch sensor 75. The relative positional relation therebetween is determined by assembly in the manufacturing process and thus varies from one multifunction peripheral 10 to another. For example, there may be a case where the center of the LCD 72 deviates from the center of the touch sensor 75 in the manner as illustrated in FIG. 4B. Thus, it is necessary to properly match, in a software manner, the coordinates on the touch sensor 75 and the coordinates on the LCD 72 for each individual multifunction peripheral 10.

<Reason 2 for the Necessity of Calibration>

Figure 5A:
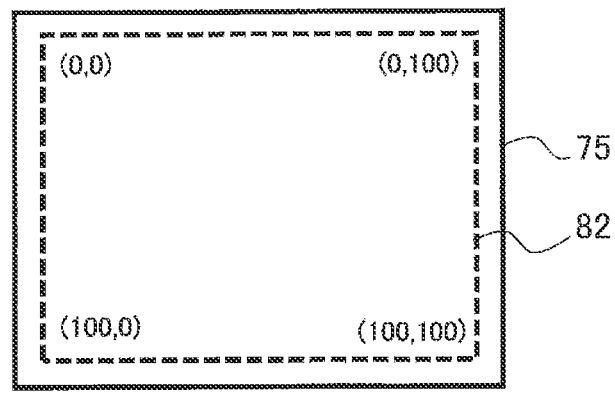
FIGS. 5A and 5B are explanatory diagrams illustrating an individual difference in size of a touch reaction area in the touch sensor.
Figure 5B:
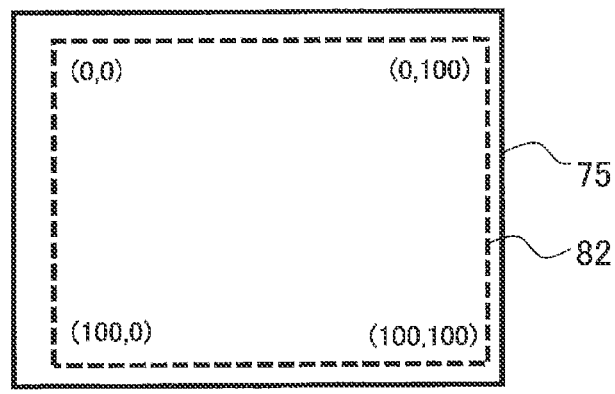

On the other hand, there is no individual difference in the physical size of the touch sensor 75 between the multifunction machines 10 of the same type. However, an individual difference occurs in the size of the touch sensor reaction area 82 which is a part of the touch sensor 75 that actually functions as a detector, as illustrated in FIGS. 5A and 5B. In FIGS. 5A and 5B, the coordinates of the upper-left corner of the touch sensor reaction area 82 are (0, 0), and the coordinates of the lower-right corner thereof are (100, 100). Further, even in the same product, the touch sensor reaction area 82 may vary due to aging.

Thus, in order to correctly match the coordinates on the touch sensor 75 (specifically, the touch sensor reaction area 82) and the coordinates on the LCD 72 (specifically, the image display area 81), it is necessary to specify a range of the touch sensor reaction area 82 in which the image display area 81 is positioned.

<Outline of Calibration Method>

Figure 6:
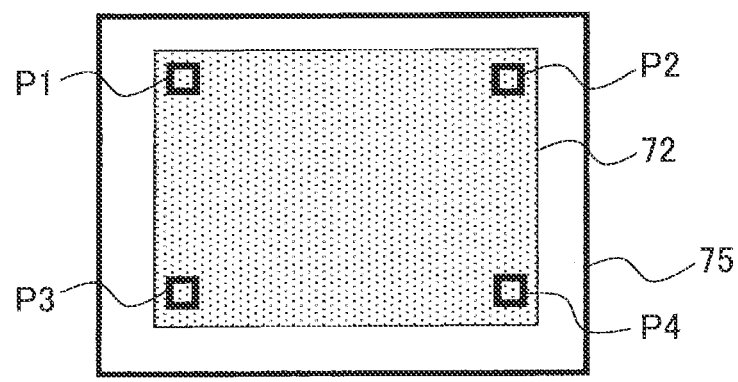
FIG. 6 is an explanatory diagram illustrating corner portions of the LCD at which a user touches when calibration is performed.

Thus, a range in which the image display area 81 of the LCD 72 exists is specified by coordinates (or positions) in the touch sensor reaction area 82 of the touch sensor 75. Hereinafter, the coordinates (or position) of the touch sensor reaction area 82 of the touch sensor 75 will be simply referred to as "coordinates (or position) of the touch sensor 75", and the image display area 81 of the LCD 72 will be simply referred to as "LCD 72". Then, based on the specified range, the specified coordinates of the touch sensor 75 are converted into the coordinates of the LCD 72. Specifically, in the present embodiment, as illustrated in FIG. 6, four corner portions P1, P2, P3, and P4 of the LCD 72 are displayed as target points which are positions for requiring a user to touch (press) with a finger, and the range of the LCD 72 is specified based on a detection result from the touch sensor 75 at the time of touch operation by the user.

<Example of Calibration Processing>

Based on information of the thus obtained corner portions P1, P2, P3, and P4, a conversion table of "coordinates of touch sensor 75→coordinates of LCD 72" is created. Assuming that the coordinate data of the above four corner portions P1, P2, P3, and P4 are P1 (upper left X, upper left Y), P2 (upper right X, upper right Y), P3 (lower left X, lower left Y), and P4 (lower right X, lower right Y), four corner portions of the LCD 72 are regarded respectively as being at the following coordinates P1', P2', P3', and P4' of the touch sensor 75, respectively:

P1'((upper left X+lower left X)/2,(upper left Y+upper right Y)/2)   (expression 1)

P2'((upper right X+lower right X)/2,(upper left Y+upper right Y)/2)   (expression 2)

P3'((upper left X+lower left X)/2,(lower left Y+lower right Y)/2)   (expression 3)

P4'((upper right X+lower right X)/2,(lower left Y+lower right Y)/2)   (expression 4).

Figure 7A:
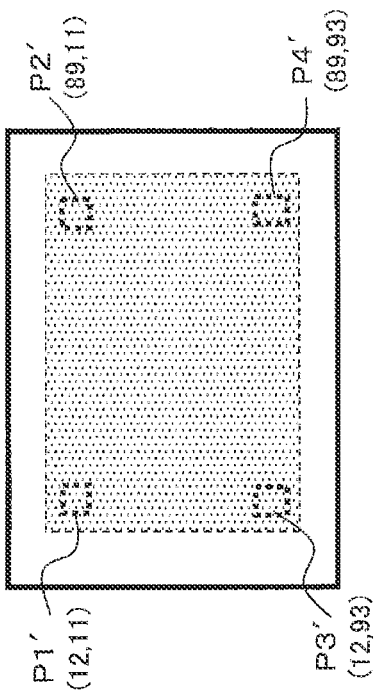
FIGS. 7A-7D are explanatory diagrams illustrating processes for calculating coordinates in the calibration.

For example, as illustrated in FIG. 7A, it is assumed that detected coordinates of the corner portions P1, P2, P3, and P4 of the LCD 72 are P1 (10, 10), P2 (90, 12), P3 (14, 94), P4 (88, 92), respectively.

Figure 7B:
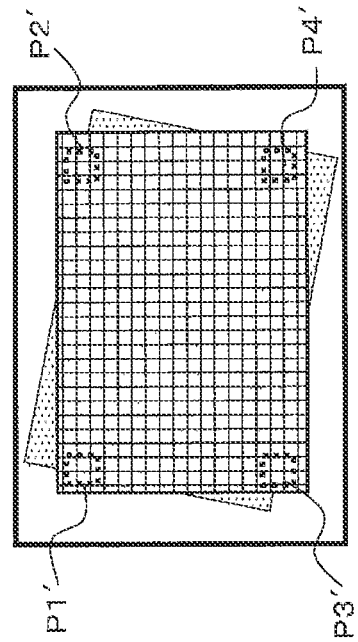

In this case, according to the above expressions 1 to 4, the corner portions of the LCD 72 are regarded respectively as being at P1' (12, 11), P2' (89, 11), P3' (12, 93), and P4' (89, 93), as illustrated in FIG. 7B.

Figure 7C:
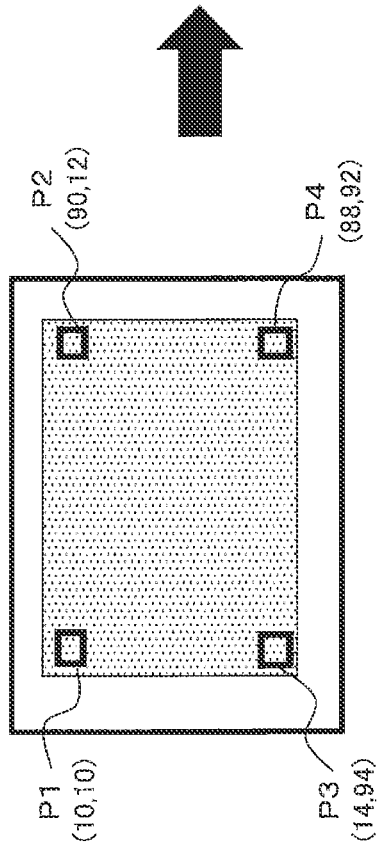
Figure 7D:
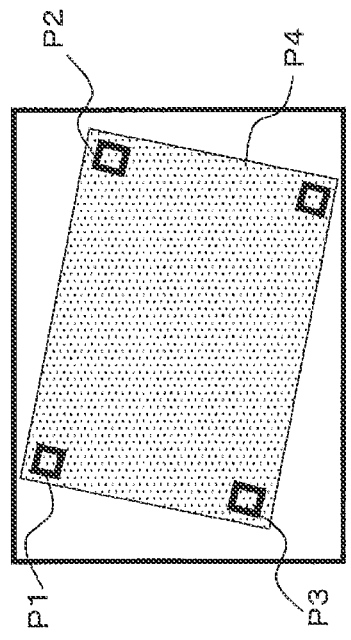

Thus, even when the LCD 72 is significantly obliquely inclined with respect to the touch sensor 75 as depicted by the corner portions P1, P2, P3, and P4 in FIG. 7C, the corner portions are regarded respectively as being at P1', P2', P3', and P4' illustrated in FIG. 7D.

<Background of Present Embodiment>

Figure 8:
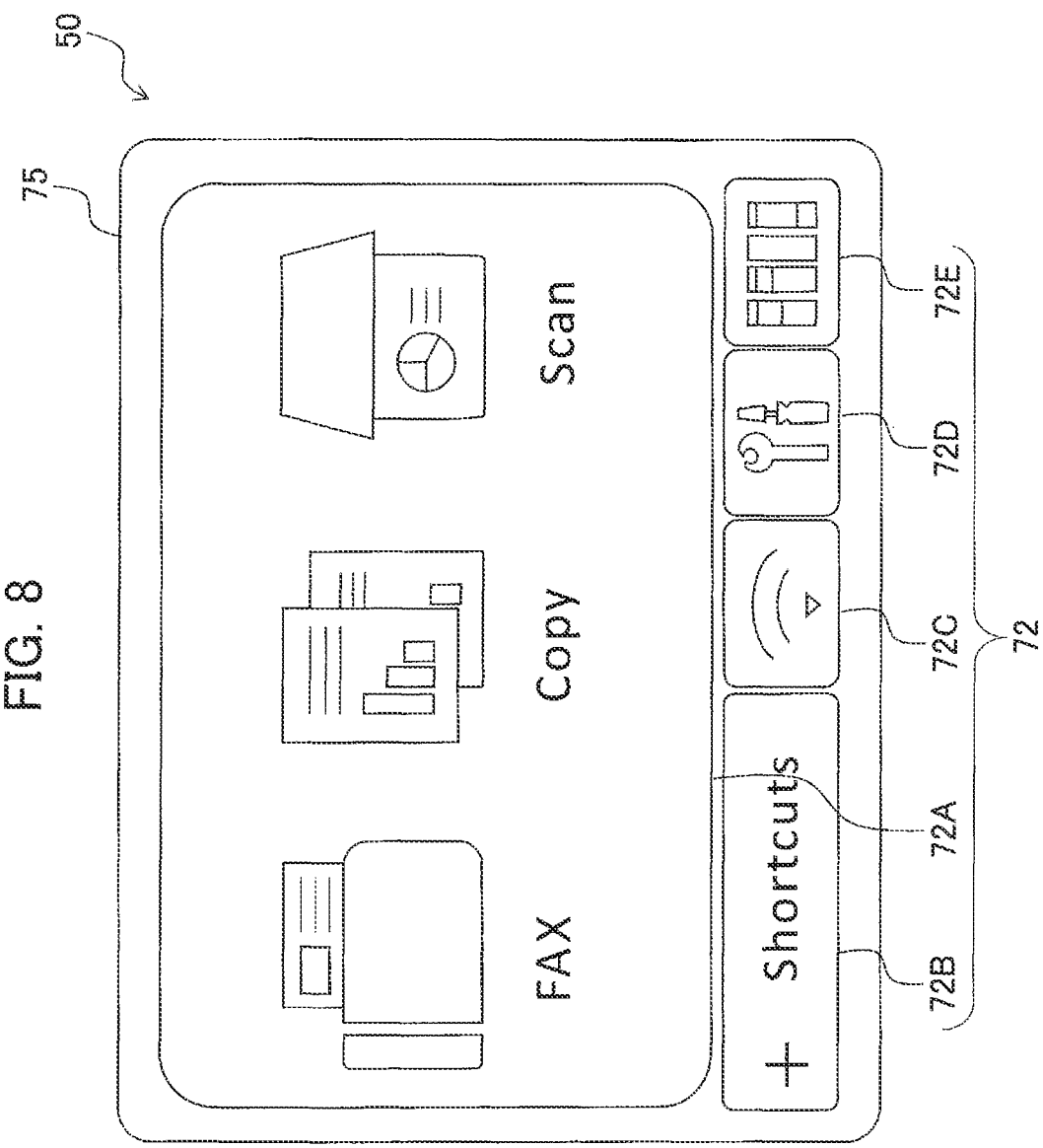
FIG. 8 is a plan view conceptually illustrating the display panel.

As described above, such target points as the corner portions P1 to P4 are displayed on the LCD 72 to prompt a user to perform touch operation, and the position of the LCD 72 is specified based on the detection result from the touch sensor 75, whereby the calibration can be made. However, as illustrated in FIG. 8, when a plurality of screens 72A to 72E to be calibrated exist on the LCD 72, the above touch operation is required for each of the screens 72A, 72B, 72C, 72D, and 72E, causing the user to perform troublesome tasks. Here, the screen indicates a display element (a partial region) displayed in the LCD 72, such as, a window, an icon, and etc.

<Outline of Method According to Present Embodiment>

The feature of the present embodiment is that calibration information for one of the plurality of screens is utilized to complete the calibration of other screens. The following specifically describes the calibration method according to the present embodiment step by step using FIGS. 9 and 10A to 10E.

<Multiple-Point Calibration>

Figure 9:
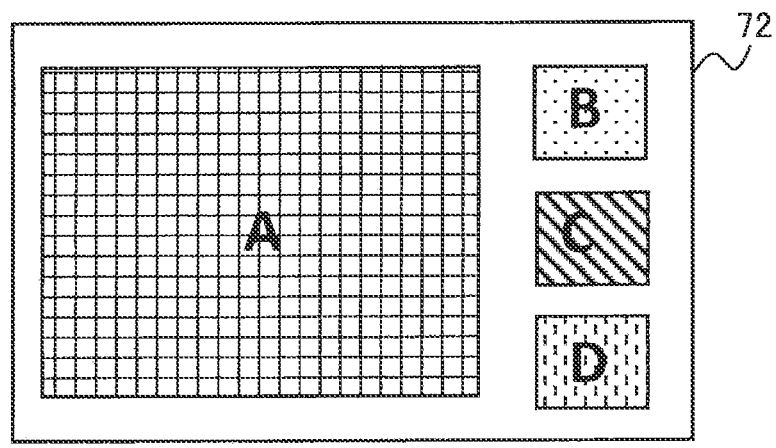
FIG. 9 is an explanatory diagram conceptually illustrating locations of screens on the LCD.

As illustrated in FIG. 9, it is assumed a case where four screens A, B, C, and D which is to be calibrated in relation to the touch sensor 75, exist on the LCD 72. The screens A, B, C, and D are separated (independent or different) screens that do not overlap one another. In the present embodiment, first, multiple-point calibration is performed for the screen A. In the present specification, the "multiple-point calibration" refers to the following method. That is, as with the case described using FIG. 6 and the like, two or more specific points on the LCD 72 are displayed as target points to be touched. Then, the position coordinates, size, and inclination of the area on the touch sensor 75 corresponding to the detection result of touch operation to the target points, i.e., those of the area on the touch sensor 75 that faces the screen A are specified. Thereafter, the specified area is calibrated as described above. Hereinafter, the area on the touch sensor 75 corresponding to the screen A is referred to as "area A" as appropriate. The area A is an example of the first area. Further, calibration performed for the screen A and the area A is hereinafter referred to as "calibration of the screen A" or "calibration of the area A" as appropriate.

Similarly, areas on the touch sensor 75 that face the screens B, C, and D are referred to respectively as "area B", "area C", and "area D". The areas B, C, and D are examples of the second area. The areas A, B, C, and D are separate (independent or different) areas that do not overlap one another. Further, calibration performed for the screens B, C, and D and areas B, C, and D is hereinafter referred to as "calibration of the screens B, C, and D" or "calibration of the areas B C, and D" as appropriate.

<Non-Operation Calibration>

Relative coordinates (coordinate deviation), size ratio, relative inclination (inclination deviation) of specific portions (e.g., center positions) between the screens A, B, C, and D on the LCD 72 are fixed to predetermined values in the manufacturing process and are thus known. Accordingly, the coordinate deviation, size ratio, inclination deviation between the areas A, B, C, and D on the touch sensor 75 are also known. As will be described later, relative position information indicating the coordinate deviation, size ratio, and inclination deviation (hereinafter, referred to collectively as "relative positional relation") between the areas A, B, C, and D is stored in the multifunction peripheral 10 (the NVRAM 40) in advance in the present embodiment. Then, the relative position information of the areas B, C, and D relative to the area A is applied to the position coordinates, size, and inclination of the area A obtained by the above calibration of the area A so as to determine the arrangement positions of the areas B, C, and D. In other words, by applying the relative position information to one area on the touch sensor 75 that has already been calibrated, the arrangement positions of the other areas on the touch sensor 75 are determined in such a manner as to reflect the calibration result of the one area without user's further operation. In the present specification, such a method as described above is referred to as "non-operation calibration".

<Failure of Non-Operation Calibration→One-Point Calibration>

There may be a case where, when the arrangement positions of the areas B, C, and D are specified by the non-operation calibration utilizing the position coordinates, size, and inclination of the area A, calibration may result in failure due to protrusion of any of the areas B, C, and D from the touch sensor 75 (the touch sensor reaction area 82). Specifically, the coordinate range of at least one of the areas B, C, and D calculated by application of the relative position information to the position coordinates, size, and inclination of the area A may deviate from the coordinate range of the touch sensor 75 (the touch sensor reaction area 82).

In such a case, one-point calibration is performed for the area B to determine the arrangement position of the area B. In the present specification, the "one-point calibration" refers to the following method. That is, to determine the arrangement position of one screen or one area on the LCD 72, more specifically, the arrangement position of the area on the touch sensor 75 corresponding to the arrangement position of one screen or one area on the LCD 72, a specific one point in the one screen or one area on the LCD 72 is displayed as a target point to be touched. Then, based on the user's touch operation to the one point, the position coordinates of the area on the touch sensor 75 corresponding to the one area are determined. The size and inclination of the area on the touch sensor 75 are determined in such a manner as to reflect the calibration results of the other areas by applying the above-mentioned size ratio and inclination deviation to the size and inclination of each of the already calibrated other areas.

<Failure of One-Point Calibration→Multiple-Point Calibration>

There may be a case where the area B still protrudes from (extends outside) the touch sensor 75 (the touch sensor reaction area 82) even after the one-point calibration for the area B is performed, and a calibration failure is occurred again. In such a case, the above-described multiple-point calibration is performed for the area B.

<Specific Example of One-Point Calibration→Multiple-point Calibration>

An example of the one-point calibration when the non-operation calibration results in failure will be described using FIGS. 10A to 10C. For simplification, it is assumed a case where only two areas, A and B, exist as areas to be calibrated, for example. In other words, the touch sensor 75 only needs to include at least two areas including the areas A and B) in the present embodiment. Here, the area A is an example of the first area and the area B is an example of the second area which is at least one area other than the first area.

Assume a case where the area A corresponding to the screen A of the LCD 72 is significantly inclined with respect to the touch sensor 75. In this case, when the non-operation calibration is performed by applying the coordinate deviation, size ratio, and inclination deviation of the area B corresponding to the screen B on the LCD 72 relative to the area A, the area B may protrude from the touch sensor 75 (the touch sensor reaction area 82) as illustrated in FIG. 10A. In this case, y-coordinates of two lower corners of the area B fall outside the maximum range of the y-coordinate of the touch sensor 75, resulting in failure of the calibration.

Figure 10A:
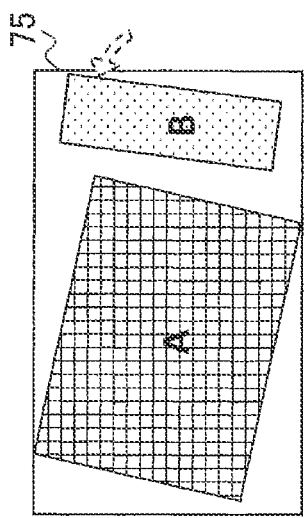
FIGS. 10A-10E are explanatory diagrams illustrating the calibration for two areas on the touch sensor.
Figure 10B:
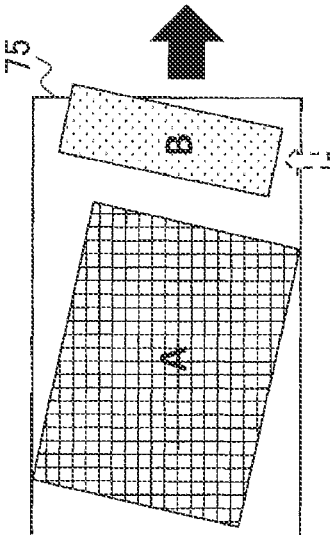

To cope with the failure of the non-operation calibration, the above-described one-point calibration is performed based on operation for one specific point (center point, etc.) of the area B as illustrated in FIG. 10B in the present embodiment. As a result, the position coordinates of the area B move to the negative side of the y-coordinate as denoted by the dashed arrow without changing the size and inclination in this example. However, also in this case, x-coordinate of an upper-right corner of the area B falls outside the maximum range of the x-coordinate of the touch sensor 75, resulting in failure of the calibration.

Figure 10C:
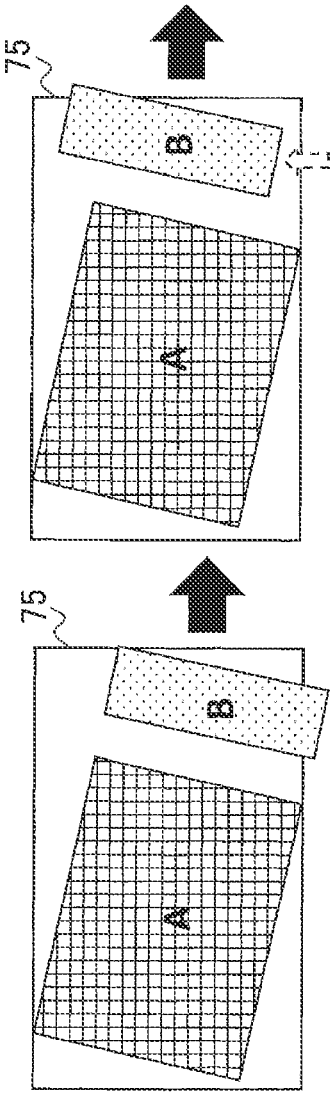

To cope with the failure of the one-point calibration, in the present embodiment, the above-described multiple-point calibration is performed based on touch operations for a plurality of points (two specific points) on the screen B corresponding to the area B, as illustrated in FIG. 10C. As a result, the inclination of the area B with respect to the touch sensor 75 becomes small in such a manner that the area B rotates counterclockwise in this example. Thus, in this case, the coordinate range of the entire area B falls within the coordinate range of the touch sensor 75, resulting in success of the calibration.

<Another Method Available in Case of Failure of Non-Operation Calibration>

When the non-operation calibration results in failure as illustrated in FIG. 10A, the multiple-point calibration may be performed for the area B as in the case illustrated in FIG. 10C, in place of performing the one-point calibration to determine the size and inclination of the area B.

<Another Method Available in Case of Failure of One-Point Calibration>

When the one-point calibration results in failure as illustrated in FIG. 10B, a method different from that illustrated in FIG. 10C may be used.

Figure 10D:
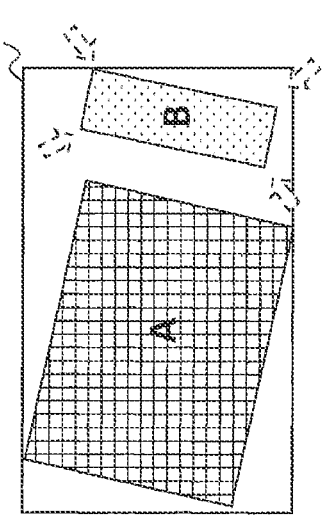

For example, as shown in FIG. 10D, the size of the area B is appropriately reduced so as not to exceed a predetermined lower limit level (e.g., 80% of the original size). The position coordinates and inclination of the specific portion of the area B are not changed in this case. Thus, the coordinate range of the entire area B falls within the coordinate range of the touch sensor 75, resulting in success of the calibration.

Figure 10E:
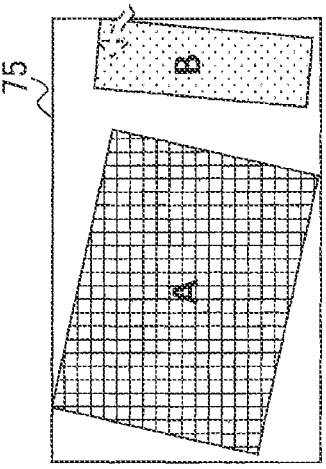

In the example illustrated in FIG. 10E, assuming that the area B is originally designed to be parallel to the touch sensor 75, the inclination of the area B is appropriately determined in a range between the inclination based on the detected inclination deviation with respect to the area A and a designed inclination, i.e., inclination parallel to the touch sensor 75. The size of the area B does not change in this case. Thus, the coordinate range of the entire area B falls within the coordinate range of the touch sensor 75, resulting in success of the calibration.

<Multiple-point Calibration→Non-Operation Calibration>

After the calibration for the area B is successfully performed to determine the arrangement position of the area B in the manner as described above, the non-operation calibration is performed for the remaining areas C and D based on this calibration result. That is, the relative position information of the areas C and D relative to the area B is applied to the specified position coordinates, size, and inclination of the area B to determine the arrangement positions of the areas C and D.

<Additional Calibration>

Even after the calibration for all the plurality of target screens on the LCD 72 is thus completed, the determined arrangement position and the actual position may deviate from each other mainly due to the non-operation calibration. Thus, a user may recognize the occurrence of such a positional deviation. For example, the user recognizes the occurrence of the deviation in a case where no reaction occurs even when the range of the screen B on the LCD 72 is touched; a case where a reaction occurs only when a specific portion (e.g., corner portion) of the screen B is touched; or a case where a reaction unintentionally occurs when a position deviating from the screen B is touched.

<Screen Selection>

In the present embodiment, to cope with the above cases, additional calibration process (hereinafter, referred to merely as "additional calibration" as appropriate) is performed in the following flow. First, a user is prompted to select, on the LCD 72, a screen to be a subject for the additional calibration, i.e., a screen that seems to be displaced. Thereafter, control is changed depending on how the selected screen has been calibrated.

When the non-operation calibration in which no user operation is performed, i.e., the number of user operation points is zero has been performed for the selected screen, the one-point calibration is performed in a way to increase the number of user operation points by one.

Similarly, when the one-point calibration has been performed for the selected screen, the multiple-point calibration is performed in a way to increase the number of user operation points.

Further, when the multiple-point calibration has been performed for the selected screen, the multiple-point calibration is performed once again.

When the screen (screen A in the above example) that has first been multiple-point calibrated and thus serves as a reference screen for other screens is deviated, the one-point calibration or non-operation calibration may be performed for other screens.

<Specific Example of Additional Calibration>

A specific example of the above additional calibration will be described for the areas A, B, C, and D corresponding respectively to the four screens, A, B, C, and D shown in FIG. 9.

(I) Case where the multiple-point calibration was performed for the area A, and the non-operation calibration was performed for areas B, C, and D In this case, the process branches depending on whether a user selects the screen A as a subject for the additional calibration.

When the screen A is not selected but any of the screens B, C, and D is selected, the one-point calibration is performed for the selected screen, and the arrangement position thereof is determined again.

When only the screen A is selected, the multiple-point calibration is performed for the area A, and the arrangement position thereof is determined again. In this case, the arrangement positions of the other areas B, C, and D are not determined again, i.e., not changed. That is, it is determined that re-calibration is not unnecessary for the areas B, C, and D based on the result that a user has not selected the screens B, C, and D. Nonetheless, the areas B, C, and D may be re-calibrated.

When both the screens A and B are selected, the multiple-point calibration is performed for the area A, and the arrangement position thereof is determined again. Thereafter, based on the result of the re-calibration for the area A, the non-operation calibration is performed for the area B using the above relative position information. When the non-operation calibration results in failure, the one-point calibration is performed for the area B as with the case described above.

(II) Case where the multiple-point calibration was performed for the area A, the one-point calibration was performed for the area B, and the non-operation calibration was performed for the areas C and D In this case as well, a process branches depending on which of the screens A, B, C, and D is selected by a user as a subject for the additional calibration.

When only the screens C and D are selected, the one-point calibration is performed for each of the selected screens C and D, and the arrangement positions thereof are determined again.

When only the screen A is selected, the multiple-point calibration is performed for the area A, and the arrangement position thereof is determined again. In this case, the arrangement positions of the other areas B, C, and D are not redetermined, i.e., not changed.

When only the screen B is selected, the multiple-point calibration is performed for the area B, and the arrangement position thereof is redetermined. In this case, the arrangement positions of the other areas A, C, and D are not redetermined, i.e., not changed.

When the screen A and at least one of the screens B, C, and D are selected, the multiple-point calibration is performed for the area A, and the arrangement position thereof is redetermined. Thereafter, based on the result of the re-calibration for the area A, the non-operation calibration is performed for the above selected one or more areas using the above relative position information. When the non-operation calibration results in failure, the one-point calibration is performed for the area for which the non-operation calibration results in failure as with the case described above.

When the screen B and the screen C or screen D are selected, the multiple-point calibration is performed for the area B, and the arrangement position thereof is redetermined. Thereafter, based on the result of the re-calibration for the area B, the non-operation calibration is performed for the area C or area D using the above relative position information. When the non-operation calibration results in failure, the one-point calibration is performed for each area for which the non-operation calibration results in failure among the areas C and D as with the case described above.

<Control Flow>

Figure 11:
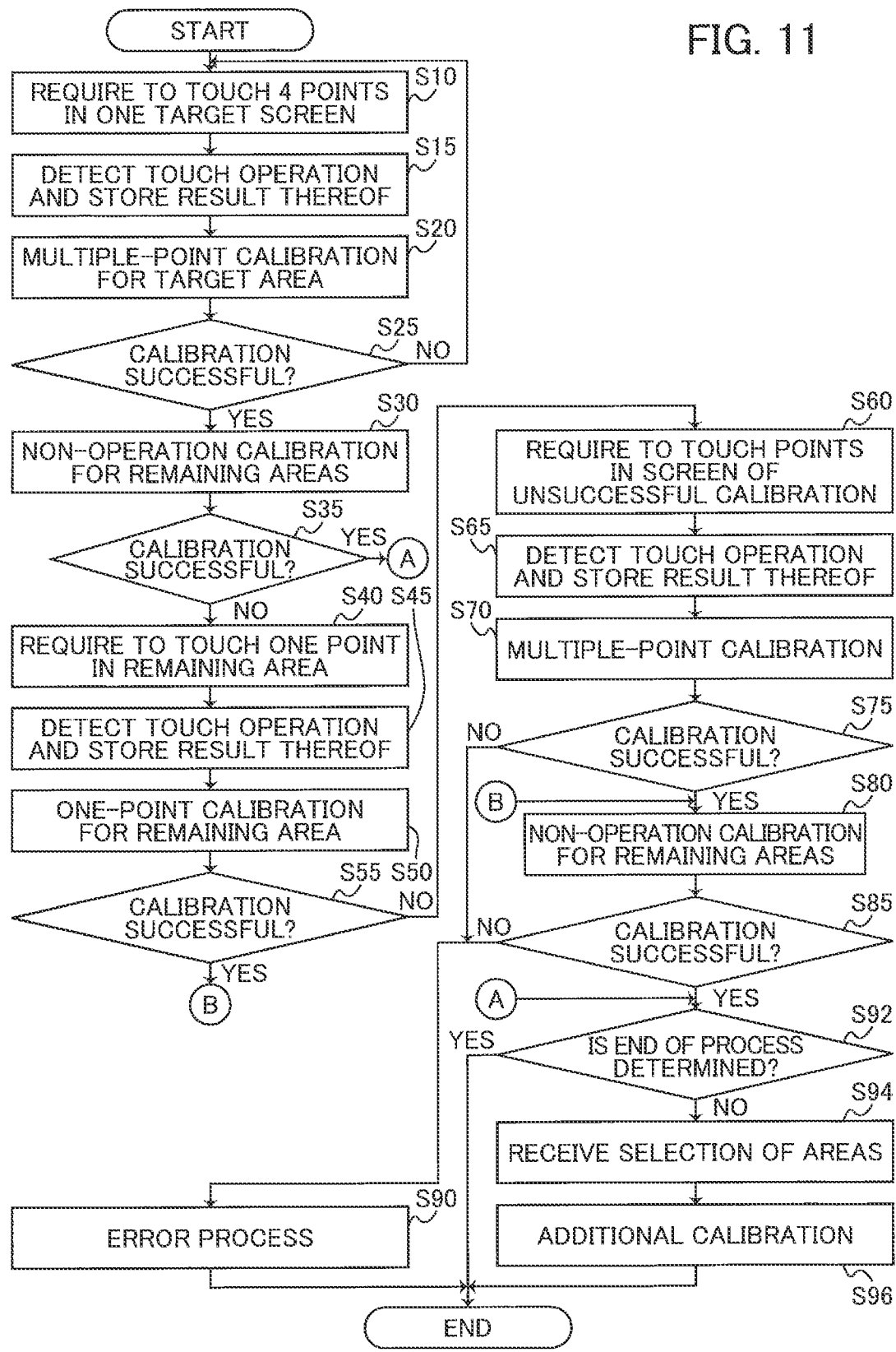
FIG. 11 is a flowchart illustrating a process executed by a CPU.

The following describes, using the flowchart illustrated in FIG. 11, a control procedure of the display processing method according to the present embodiment implementing the method described above, which is executed by the CPU 14 based on the display process program 18 stored in the ROM 16. This processing flow starts when a user operates the display panel 50 or hard key 52 to start calibration. The following description will be made assuming that the above four screens A, B, C, and D to be calibrated exist on the LCD 72.

In S10, the CPU 14 controls the LCD 72 to display, on one of the plurality of screens to be calibrated, two or more specific points to be touched by the user as target touch points. In the example described above, the four corner portions of the screen A correspond to the target touch points.

When the user touches each target point according to the display, in S15 the CPU 14 detects touch operation at a portion of the touch sensor 75 that corresponds to each target point, and acquires and stores in the NVRAM 40 a result of the detection (detected coordinates). The portions on the touch sensor 75 corresponding to the touch operation, that is, four points corresponding to four corners of the screen A on the LCD 72 in this example are examples of the first target portion.

In S20, based on the detection result of the touch operation, i.e., detected coordinates in S15, the CPU 14 performs the multiple-point calibration. The process executed through S10, S15, and S20 in an example of the first calibration process. In the example described above, a detected coordinate deviation of the area A is corrected by the calibration, and the position coordinates, size, and inclination of the area A are specified to define the coordinate range of the x- and y-coordinates of the area A.

In S25, the CPU 14 determines whether the multiple-point calibration executed in S20 results in success. When only three or less detected coordinates are acquired for four target points, or when obtained detected coordinates significantly deviate from the area A, "No" (calibration failure) is determined, and the flow returns to S10. Otherwise, "Yes" (calibration success) is determined, and the flow advances to S30.

In S30, the CPU 14 performs the non-operation calibration of the other areas based on the calibration result in S20. The process executed in S30 is an example of the second calibration process. In the above example, the relative position information of each of the areas B, C, and D relative to the area A is read from the NVRAM 40 and applied to the coordinate range of the area A (the position coordinates, size, and inclination of the area A), i.e., obtained in S20. As a result, the coordinate range of each of the areas B, C, and D (the position coordinates, size, and inclination of each of the areas B, C, and D) are defined.

In S35, the CPU 14 determines whether the non-operation calibration executed in S30 results in success. As described above, when any of the areas B, C, and D protrudes from the touch sensor 75, "No" (calibration failure) is determined, and the flow advances to S40. The condition that the coordinate range defined by the non-operation calibration significantly deviates from the touch sensor 75 (specifically, the touch sensor reaction area 82) is an example of the calibration failure condition. When such a failure condition is not met, "Yes" (calibration success) is determined, and the flow advances to S92. That is, in this case, a third calibration process to be described later in S40, S45, S50, etc., is not executed.

In S40, the CPU 14 controls the LCD 72 to display at least one specific target point requiring the user's touch operation in one screen for which the above non-operation calibration results in failure. In the above example, an appropriate one point on the screen B corresponds to the target point.

When the user touches the target point according to the display, in S45 the CPU 14 detects the touch operation at a portion of the touch sensor 75 that corresponds to the target point, and acquires and stores in the NVRAM 40 a result of the detection (detected coordinates). The portion corresponding to at least one target point in the touch sensor 75, that is, a point corresponding to one target point in the screen B of the LCD 72 in the area B is an example of a second target portion.

In S50, the CPU 14 performs the one-point calibration based on the detection result of the touch operation i.e., detected coordinates in S45. The process executed through S40, S45, and S50 is an example of the calibration process. In the above example, at least one of the position coordinates, size, and inclination of the area B is changed by the calibration, and the coordinate range of the area B defined by this change is corrected so that (to achieve that) the coordinate range of the area B does not meet the above failure condition. In the example illustrated in FIG. 10B, only the position coordinates are changed without changing the size and inclination.

In S55, the CPU 14 determines whether the one-point calibration executed in S50 results in success. When the above failure condition is not met, "Yes" (calibration success) is determined, and the flow advances to S80. When the failure condition is still met, "No" (calibration failure) is determined, and the flow advances to S60. The processes of S40-S50 may be performed for each area for which the above non-operation calibration is determined to result in failure in S35. In this case, the process of S60-S75 (described later) may be performed for each area for which No determination is made in S55. In this case, the process of S80 and S85 may be skipped.

In S60, the CPU 14 controls the LCD 72 to display a plurality of specific target points for requiring user's touch operation in the screen for which the above one-point calibration results in failure. In the above example, upper-left and lower-right two points on the screen B correspond to the displayed target points.

When the user touches the target points according to the display, in S65 the CPU 14 detects the touch operations at portions of the touch sensor 75 that correspond to the target points, and acquires and stores in the NVRAM 40 a result of the detection (detected coordinates). The portions of the touch sensor 75 corresponding to the target points, that is, the two points corresponding to the two target points in the screen B of the LCD in the area B are examples of the third target portion.

In S70, the CPU 14 performs the multiple-point calibration based on the detection result of the touch operation i.e., detected coordinates in S65. The process executed through S60, S65, and S70 is an example of the fourth calibration process. In the above example, at least one of the position coordinates, size, and inclination of the area B is changed by the calibration, the coordinate range of the area B defined by this change is re-corrected so that (to achieve that) the coordinate range of the area B does not to meet the above failure condition. In the example illustrated in FIG. 10C, only the inclination is changed without changing the position coordinates and the size.

When, in S55, the failure condition is still met and, accordingly, "No" (calibration failure) is determined, the CPU 14 may perform: skipping S60 and S65; and in S70, reducing the size so as not to exceed a predetermined lower limit level as illustrated in FIG. 10D or correcting inclination without changing the size of the area is as illustrated in FIG. 10E.

In S75, the CPU 14 determines whether the multiple-point calibration executed in S70 results in success. When the failure condition is still met, "No" (calibration failure) is determined, and the flow advances to S90. When the above failure condition is not met, "Yes" (calibration success) is determined, and the flow advances to S80.

When the flow proceeds to S80 from "Yes" determination in S55, in S80 the CPU 14 performs the non-operation calibration of the other areas based on the calibration result in S50. When the flow proceeds to S80 from Yes determination in S75, in S80 the CPU 14 performs the non-operation calibration of the other areas based on the calibration result in S70.

In the case of the shift from S55 to S80, the coordinate deviation of each of the areas C and D relative to the area B is read from the NVRAM 40 and applied to the position coordinates of the area B obtained in S50 in the above example. Further, the size ratio and inclination deviation of each of the areas C and D relative to the area A are read from the NVRAM 40 and applied to the size and inclination of the area A obtained in S20. This is because the multi-point calibration is performed for the area A and the position of the area A has high reliability. Accordingly, the coordinate range (the position coordinates, size, and inclination) of each of the areas C and D is defined.

In the case of the shift from S75 to S80, the coordinate deviation, size ratio, and inclination deviation of each of the areas C and D relative to the area B is read from the NVRAM 40 and applied to the position coordinates, size, and inclination, i.e., the coordinate range, of the area B obtained in S70 in the above example. Accordingly, the coordinate range (the position coordinates, size, and inclination) of each of the areas C and D is defined.

In S85, the CPU 14 determines whether the non-operation calibration executed in S80 results in success. When the above failure condition is not met, "Yes" (calibration success) is determined, and the flow advances to S92. When the failure condition is still met, "No" (calibration failure) is determined, and the flow advances to S90.

In S90, the CPU 14 performs a predetermined error process, and thereafter, ends this routine. The CPU 14 controls the LCD 71 to display a message "calibration cannot be made" as the error process for example.

In S92, the CPU 14 determines whether to end all the calibration processes. When the user makes an operation requiring to perform the above-described additional calibration, "No" is determined, and the flow advances to S94. When the user does not make such an operation, Yes is determined, and this routine is ended.

In S94, the CPU 14 receives the selections of areas subject for the additional calibration input through user operations via the LCD 72. In the above example, at least one of the areas A to D is selected as the area which the user requires to be a subject for the additional calibration. The process executed in S94 is an example of the area selection reception process.

In S96, the CPU 14 performs the additional calibration based on the results of the area selection(s) in S94. Accordingly, the correction of the detected coordinate deviation is performed for areas selected in S94 whereas the correction of the detected coordinate deviation is not performed for the areas not selected in S94 among the areas A-D. The process executed in S96 is an example of the additional calibration process.

<Effects of the Embodiment>

The touch sensor 75 of the multifunction peripheral 10 according to the present embodiment has a first area and a second area. In the above example, the area A is defined as the first area, and the areas B, C, and D are each defined as the second area. Through the processes of S10, S15, and S20 that the CPU 14 executes, a detected coordinate deviation of the area A is corrected based on a detection result of touch operation to a first target portion of the area A, whereby a range that the area A occupies on the coordinates of the touch sensor 75, i.e., the coordinate range is defined.

The NVRAM 40 according to the present embodiment has already stored relative position information indicating the positional relation between the area A as the first area and the areas B, C, and D as the second area. In S30, the relative position information stored in the NVRAM 40 is applied to the defined coordinate range of the area A so as to define the coordinate range of each of the areas B, C, and D.

When the coordinate range of any of the areas B, C, and D defined in S30 meets a predetermined calibration failure condition, the processes of S40, S45, S50, and etc. are performed, whereby the coordinate range of the corresponding area is corrected so as not to meet the failure condition.

As described above, according to the present embodiment, by applying the already obtained relative positional relation between the first and second areas to a result of the calibration performed for the first area which requires the user operation. Accordingly, the calibration can be performed for the second area without requiring the user to perform troublesome operations.

When the coordinate range of any of the areas B, C, and D as the defined second area protrudes from the touch sensor reaction area 82 of the touch sensor 75 within which the touch operation can substantially be detected, the calibration is determined to result in failure.

In such a case, the processes of S40, S45, S50, and etc. are executed, whereby the coordinate range of the second areas B, C, and D for which the calibration has been determined to result in failure can be corrected so as to fall within the touch sensor reaction area 82.

In the present embodiment, when the coordinate range of any of the second areas B, C, and D for which the non-operation calibration has been performed in S30 meets the calibration failure condition, at least one of the position coordinates, size, and inclination of the coordinate range of one of the areas B, C, and D which meets the calibration failure condition is changed. Accordingly, the coordinate range of the corresponding area can be corrected so as not to meet the calibration failure condition.

Further, in the present embodiment, before the one-point calibration is executed through S45, S50, and etc., the user is required to touch a second target portion of at least one of the second areas B, C, and D for which the calibration has been determined to result in failure. When the user touches the second target portion, the one-point calibration is performed based on the detection of the touch. Accordingly, the coordinate range of the corresponding area is corrected.

According to this configuration, by performing at least a one touch operation, at least the position coordinates of at least one of the second areas B, C, and D that meet the calibration failure condition can be specified accurately among the position coordinates, the size, and inclination that define the coordinate range of the area.

When one of the coordinate ranges of the areas B, C, and D that have been corrected by the one-point calibration through the processes of S40, S45, S50, and etc., still meets the calibration failure condition, the multiple-point calibration is performed in S65, S70, and etc. Before execution of the processes of S65, and S70, the user is required to touch a plurality of third target portions of one of the second areas B, C, and D that meets the calibration failure condition. When the user touches the third target portions, the coordinate range of the one of the areas B, C, and D is recorrected based on the detection of the touch.

According to the configuration, by making the number of touches larger at the time of executing the multiple-point calibration in S60, S65, and S70 than at the time of executing the one-point calibration in S40, S45, S50, etc., the coordinate range of one of the areas B, C, and D that meets the calibration failure condition can be specified more accurately.

Even when the coordinate ranges of the second areas B, C, and D do not meet the calibration failure condition, there may be a case where the user feels somewhat unsatisfactory about operational feeling.

In such a case, the user selects at least one area for which he or she wants to perform the additional calibration in S94, and the additional calibration is executed for the selected areas in S96.

According to the present embodiment, the additional calibration is performed for area(s) designated by the user to correct the coordinate range of the area, whereby the user's sense of unsatisfaction can be solved.

While the disclosure has been described in detail with reference to the specific embodiment thereof, it would be apparent to those skilled in the art that various changes and modifications may be made therein without departing from the technical concept as described below.

(1-1) Case where Inclination is not Used in Non-Operation Calibration (1)

When it is known that there is no difference in inclination between all the areas to be calibrated, the inclination deviation may be not be used among the coordinate deviation, inclination deviation, and size ratio which constitute the relative position information, and thus only the coordinate deviation and size ratio may be used.

Figure 12A:
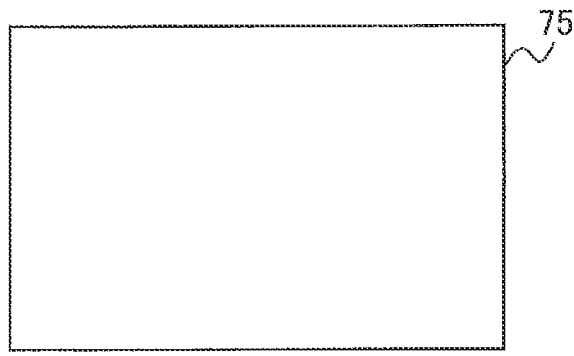
FIGS. 12A-12C are explanatory diagram conceptually illustrating an example in which a non-operation calibration does not use information on inclination.

As illustrated in FIG. 12A, assume a case where square areas A and B to be calibrated exist on the touch sensor 75 so as to correspond to the screens A and B on the LCD 72. In this case, the NVRAM 40 stores in advance the relative positional relation (in this example, coordinate deviation and size ratio) between the areas A and B which is determined by the assembly of the LCD 72 in the manufacturing process. For example, the NVRAM 40 stores as the coordinate deviation information that the center of the area B deviates rightward and upward from the center of the area A by 10 cm and 2 cm, respectively, and that the length of one side of the area B is half the length of one side of the area A.

Figure 12B:
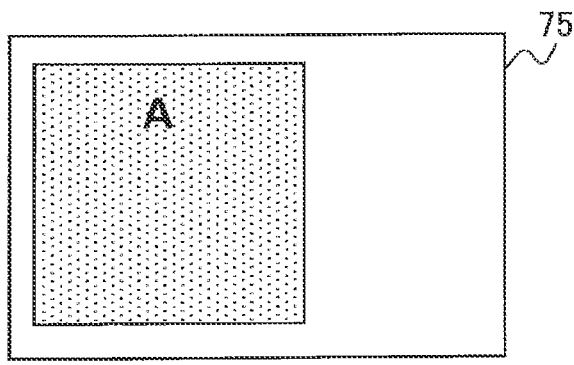
Figure 12C:
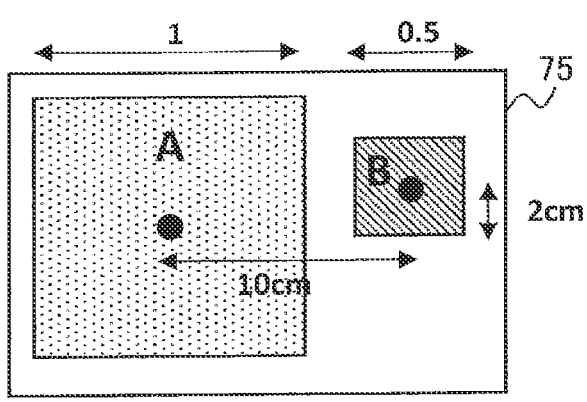

Under the above assumption, the position coordinates and size of the area A are determined in S10 and S15 of FIG. 11 and the multiple-point calibration in S20, and thus the arrangement position of the area A is defined (FIG. 12B). Thereafter, in the non-operation calibration in S30 of FIG. 11, the coordinate deviation and size ratio stored are applied to the defined position coordinates and size of the area A, thereby determining the position coordinates and size of the area B and defining the arrangement position thereof (FIG. 12C).

In this case, only the coordinate deviation and size ratio are used as the relative position information, and the inclination deviation is not used. In the first embodiment, the NVRAM 40 stores the value of "0" as the inclination deviation together with the coordinate deviation, size ratio and inclination deviation as the relative positional relation. However, in the second embodiment, the NVRAM 40 need not stores the value of "0" for the inclination deviation as a component of the relative positional relation.

(1-2) Case where Inclination is not Used in Non-Operation Calibration (2)

Figure 13A:
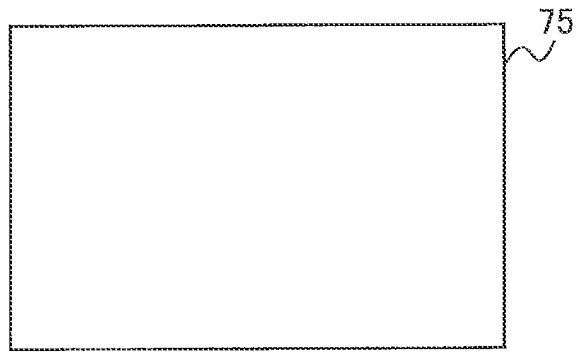
FIGS. 13A-13C are explanatory diagram conceptually illustrating an example in which a non-operation calibration does not use information on inclination.
Figure 13B:
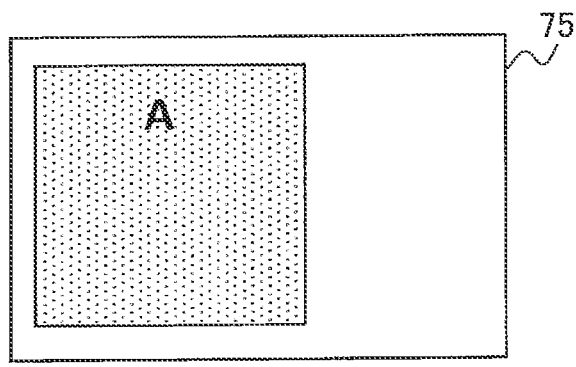
Figure 13C:
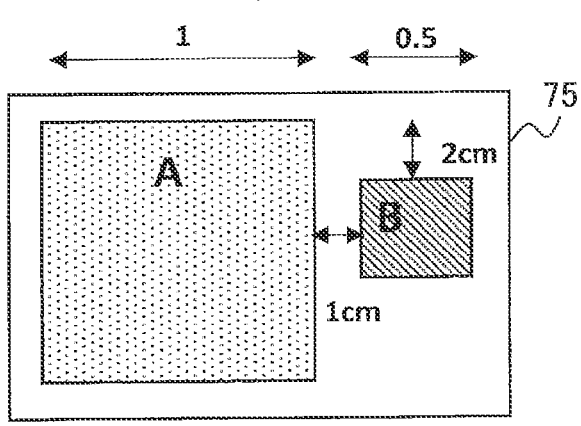

In the example illustrated in FIGS. 13A to 13C, the NVRAM 40 stores as the coordinate deviation indicating the relative positional relation between the areas A and B on the touch sensor 75. Specifically, the NVRAM 40 stores information indicating that the left side of the area B is at a position deviating rightward from the right side of the area A by 1 cm and that the upper side of the area B is at a position lower by 2 cm in height than the upper side of the area A. The NVRAM 40 also stores, as the size ratio, information indicating that the length of one side of the area B is half the length of one side of the area A similarly to the case (1-1).

In this case as well, like the case (1-1), the arrangement position of the area A is defined by the multiple-point calibration (FIG. 13B). Thereafter, in the non-operation calibration, the coordinate deviation and size ratio are applied to the position coordinates and size of the area A, thereby determining the position coordinates and size of the area B and defining the arrangement position thereof (FIG. 13C).

Figure 14A:
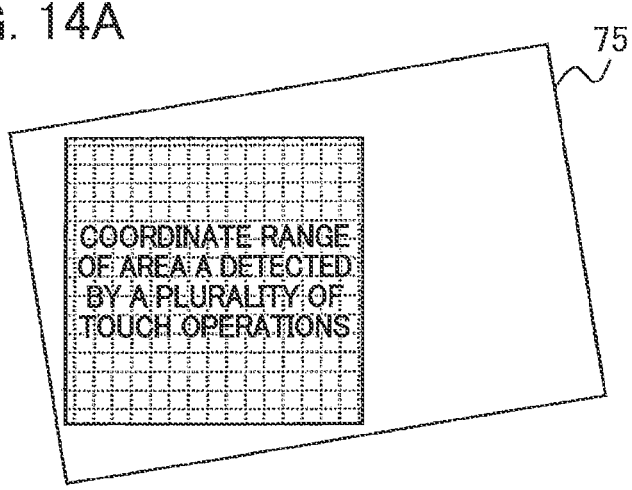
FIGS. 14A-14C are explanatory diagram conceptually illustrating an example in which a non-operation calibration does not use result of multi-point calibration performed immediately before the non-operation calibration.
Figure 14B:
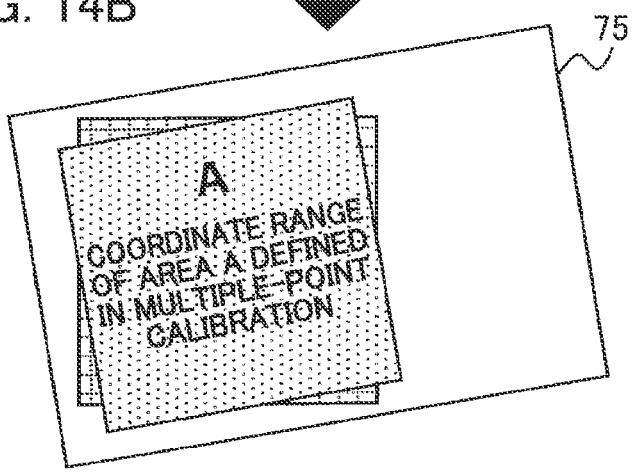

(1-3) Case where the Result of Immediately Preceding Multiple-Point Calibration is not Used in Non-Operation Calibration There may be a case where the coordinate range of the area A detected in S10 and S15 of FIG. 11 is inclined with respect to the touch sensor 75 as illustrated in FIG. 14A. In such a case, when the arrangement position of the area A is defined by the multiple-point calibration in the subsequent S20, there may be a case where this arrangement position can be set only in parallel to the touch sensor 75 in S20 as illustrated in FIG. 14B because of the configuration of the touch sensor 75.

In this modification, to cope with this, the non-operation calibration in the subsequent S30 is performed by using not the coordinate range of the area A defined in the multiple-point calibration in S20 but using the coordinates of the area A detected based on the user's touch operations for a plurality of points in S15. In this modification, the process executed in S15 is an example of the storing process. The process executed through S10, S15, and S20 is an example of the first calibration process. The process executed in S30 is an example of the second calibration process.

Figure 14C:
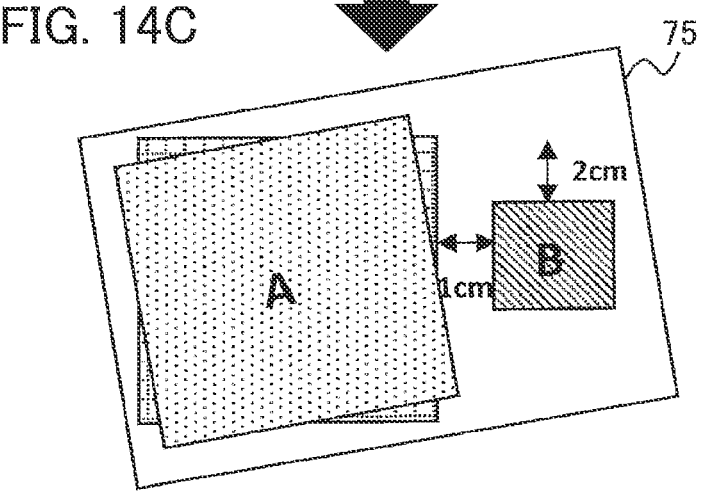

FIG. 14C illustrates the non-operation calibration of area B set in S30 in this case. That is, similarly to the modification (1-2) shown in FIG. 13C, the NVRAM 40 stores as the coordinate deviation between the areas A and B on the touch sensor 75, information indicating that the left side of the area B is at a position deviating rightward from the right side of the area A by 1 cm and that the upper side of the area B is at a position lower by 2 cm in height than the upper side of the area A. The NVRAM 40 also stores, as the size ratio, information indicating that the length of one side of the area B is half the length of one side of the area A. Further, the NVRAM 40 stores, as the inclination deviation, a value of "0" when it is known that there is no inclination.

Then, in the non-operation calibration of the area B, the stored coordinate deviation, size ratio, and inclination deviation are applied to the actually-detected position coordinates, size, and inclination of the area A illustrated in FIG. 14A which are detected based on the user's touch operation. That is, the stored relative positional information is not applied to the position coordinates, size, and inclination of the area A illustrated in FIG. 14B which is defined by the multiple-point calibration. Thus, as illustrated in FIG. 14C, the coordinate range of the area B is determined based on the position coordinates, size, and inclination, whereby the arrangement position thereof can be defined properly.

Second Embodiment

A second embodiment will be described while referring to FIGS. 15 and 16.

Figure 15:
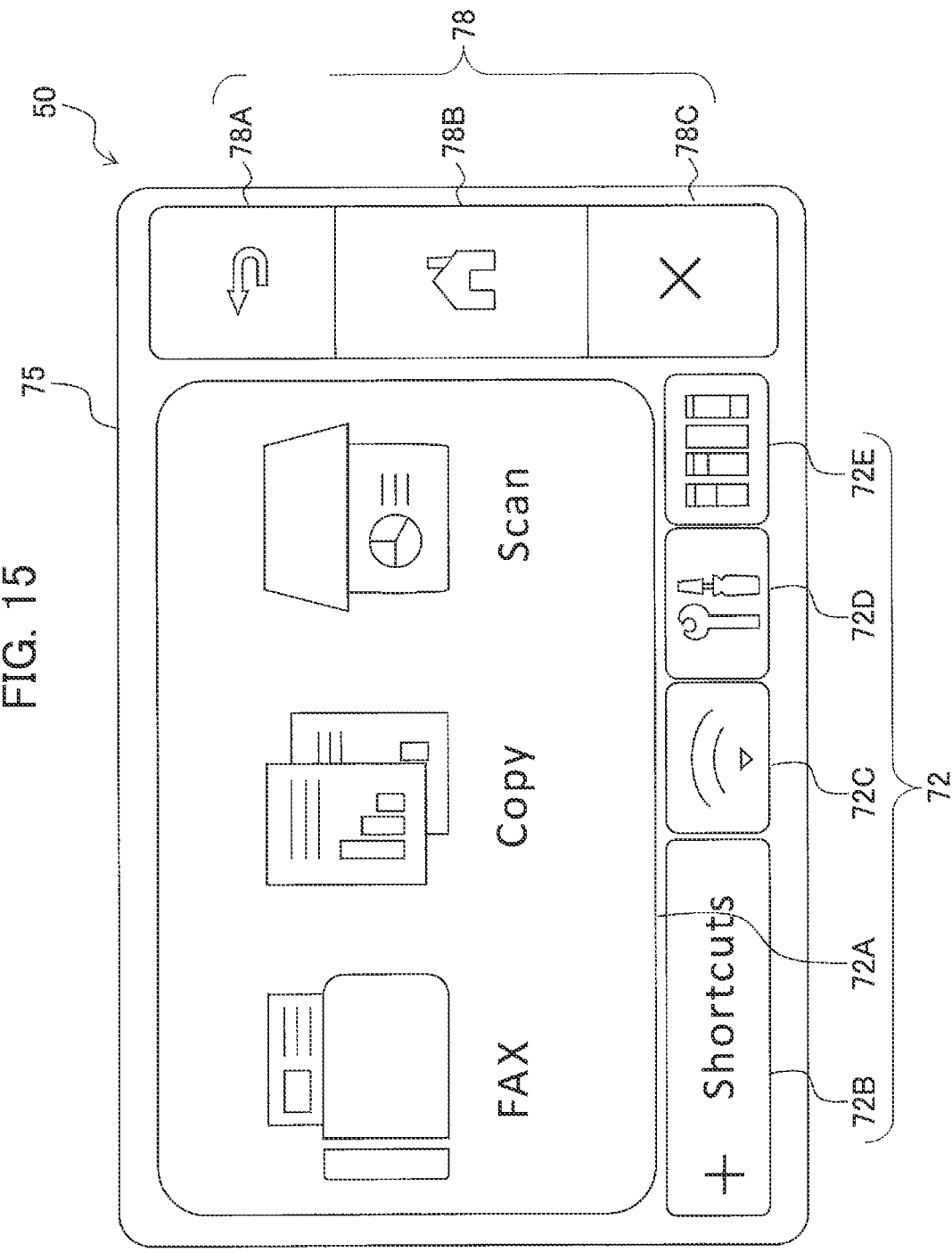
FIG. 15 is a plan view conceptually illustrating a display panel according to an embodiment.
Figure 16:
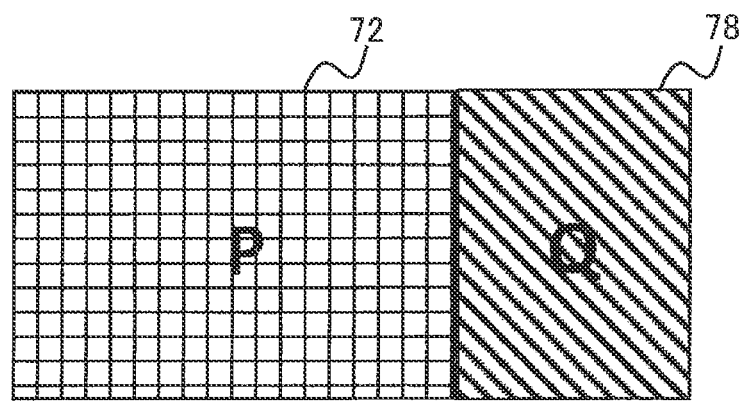
FIG. 16 is an explanatory diagram conceptually illustrating locations of the LCD and a display image part on the LCD according to an embodiment.

In the second embodiment, as illustrated in FIG. 15 which corresponds to FIG. 8, the display panel 50 has the LCD 72 and a display image part 78. The display image part 78 is different from the LCD 72. The display image part 78 is a plate like member displaying fixed (predetermined) images or information such as fixed symbols or icons. Like the LCD 72, the display image part 78 is a component independent of the touch sensor 75.

Similarly to the example shown in FIG. 8, the LCD 72 has screens 72A, 72B, 72C, 72D, and 72E. The display part 78 has three operation buttons 78A, 78B, and 78C with a character, a graphic, a symbol, etc. Further, as illustrated in FIG. 16, the display part 78 is arranged adjacent to one side (right side) of the LCD 72 in a plan view. In FIG. 16, for consistency with the following description using FIGS. 17A to 17D and easy understanding, symbols "P" and "Q" are added to the LCD 72 and display image part 78, respectively.

As illustrated in FIGS. 17A to 17D, the touch sensor 75 has an area P located in an opposing area opposing the LCD 72 and an area Q located in a non-opposing area not opposing the LCD 72 (opposing the display image part 78, in this example). The areas P and Q are independent areas not overlapping each other. As described above, the display image part 78 is a component separate (different) from the touch sensor 75. The relative positional relation between the display image part 78 and the touch sensor 75 is determined by an assembly in the manufacturing process, and thus, the arrangement position of the display image part 78 also needs to be calibrated. The calibration of the areas P and Q in the present embodiment will be described using FIGS. 17A to 17D. In the second embodiment, the areas P and Q are respectively examples of the first and second areas.

First, as in the first embodiment, S10, S15, and S20 of FIG. 11 are executed for the area P, whereby the multiple-point calibration is performed for the area P. That is, two or more specific points on the LCD 72 are displayed as target points to be touched. Then, the position coordinates, size, and inclination of the area P on the touch sensor 75 corresponding to the detection result of the touch operation to the target points are specified. In this embodiment, the process through S10, S15, and S20 is an example of the first calibration process.

At this time, coordinate deviation, size ratio, and inclination deviation of specific portions (e.g., center positions) between the LCD 72 and the display image part 78 are fixed to predetermined values in the manufacturing process and are thus known. Accordingly, the coordinate deviation, size ratio, inclination deviation between the areas P and Q on the touch sensor 75 are also known. In the present embodiment, the relative position information indicating the coordinate deviation, size ratio, and inclination deviation between the areas P and Q is stored in the NVRAM 40. Then, in the non-operation calibration in S30 of FIG. 11, the relative position information of the area Q relative to the area P is applied to the position coordinates, size, and inclination of the area P obtained (defined) by the above calibration of the area P so as to specify (define) the arrangement position of the area Q. The process of S30 is an example of the second calibration process.

There may be a case where, when the arrangement position of the area Q is specified (defined) by the non-operation calibration utilizing the position coordinates, size, and inclination of the area P, the non-operation calibration results in failure. For example, when the LCD 72 is significantly inclined with respect to the touch sensor as illustrated in FIG. 17A, the calibration is performed using the method so that (to achieve that) the inclination of the area P is substantially eliminated as illustrated in FIG. 17B similarly to the example shown in FIGS. 7C and 7D.

In this case, when the non-operation calibration is performed for the area Q, by applying the relative positional relation of the area Q to the area P for which the calibration has been performed, the coordinate range of the area Q defined by this non-operation calibration significantly deviates from the actual (detected) coordinate range of the area Q as illustrated in FIG. 17B, and the deviation therebetween exceeds a predetermined threshold value. The condition that deviation between the coordinate range before the non-operation calibration is performed and the coordinate range after the non-operation calibration is performed exceeds the predetermined threshold value is an example of the calibration failure condition.

In such a case, recalibration is performed for the area Q for which the calibration has been performed so that (to achieve that) the calibration failure condition is not met, i.e., so that (to achieve that) the deviation between the coordinate range of the area Q defined after the recalibration and the coordinate range of the area Q before the non-operation calibration (actual or detected coordinate range of the area Q) is performed becomes equal to or less than the predetermined threshold value.

Specifically, as illustrated in FIG. 17C, the coordinate range of the area Q defined by the aforementioned non-operation calibration is appropriately slid downward (in the positive y-direction) in the drawing. In this case, after "No" determination is made in S35 of FIG. 11, S40 and S45 are skipped, and in the procedure corresponding to S50, calibration is performed to add an appropriate positive value to the position coordinates of the portions of the area Q to achieve the above slide movement. Here, since S40 and S45 are skipped, the slide movement in the calibration performed in S50 does not use the detection result of S45. This process is an example of the third calibration process.

Alternatively, a large inclination of the LCD 72 illustrated in FIG. 17A detected in S15 is applied as it is to the area Q defined by the non-operation calibration so that (to achieve that) the area Q is inclined in accordance with the actual inclination of the area P. In this case as well, after "No" determination in S35 of FIG. 11, S40 and S45 are skipped, and in the procedure corresponding to S50, calibration is performed to apply the actual inclination of the area P to the coordinate range of the portions of the area Q. In this case, the calibration of S50 does not use the detection result of S45. This process is an example of the third calibration process.

Processes other than described above are the same as the first embodiment, and thus the detailed description is omitted.

<Effects of the Second Embodiment>

The same effects as the first embodiment can be obtained according to the second embodiment.

Specifically, the touch sensor 75 of the multifunction peripheral 10 according to the present embodiment has the area P as a first area and the area Q as a second area. Through the processes of S10, S15, and S20 that the CPU 14 executes, a detected coordinate deviation of the area P is corrected based on a detection result of touch operation to a first target portion of the area P, whereby the coordinate range of the area P is defined.

The NVRAM 40 according to the present embodiment has already stored relative position information indicating the positional relation between the area P and the area Q. In S30, the relative position information stored in the NVRAM 40 is applied to the defined coordinate range of the area P so as to define the coordinate range of the area Q.

When the coordinate range of the area Q defined in S30 meets the predetermined calibration failure condition, the recalibration process corresponding to S50 is performed, whereby the coordinate range of the area Q is corrected so as not to meet the failure condition.

As described above, according to the present embodiment, by applying the already obtained relative positional relation between the first and second areas to a result of the calibration performed for the first area which uses the detection result of the user operation. Accordingly, the calibration can be performed for the second area without requiring the user to perform troublesome operations.

When the deviation between the coordinate range of the area Q as the second area as the defined second area by the calibration and the coordinate rage of the area Q before being defined by the calibration exceeds the predetermined threshold value, the calibration is determined to be unsuccessful.

In such a case, the recalibration process corresponding to S50 is executed so that (to achieve that) the deviation between the coordinate range of the area Q defined by the recalibration performed after determining the previous unsuccessful calibration and the coordinate rage of the area Q defined after the calibration does not exceed the predetermined threshold value. Accordingly, the deviation can be corrected.

In the present embodiment, when the coordinate range of the second area Q for which the non-operation calibration has been performed in S30 meets the calibration failure condition, at least one of the position coordinate(s), size, and inclination of the coordinate range of the area Q which meets the calibration failure condition is changed. That is, the position coordinate(s) is changed as shown in FIG. 17C or the inclination is changed as shown in FIG. 17D. Alternatively, the size of the area Q may be changed. Accordingly, the coordinate range of the area Q can be corrected so as not to meet the calibration failure condition.

In the second embodiment, the touch sensor 72 has the opposing area opposing the LCD 75 and the non-opposing area not opposing the LCD 72. The non-opposing area can be corrected without requiring a user to perform troublesome operations.

<Other Modifications>

Although the present disclosure is applied to a printing apparatus, specifically, multifunction peripheral 10, as an electronic apparatus, in the above embodiments, but the electronic apparatus is not limited thereto. That is, the present technique may be applied to a printer that prints images and characters on normal printing paper of A4, A3, B4 and B5 sizes, a mobile printer driven by a battery power supply, and a printing label forming device (label printer) that performs desired printing processes for a printing tape to form a printing label. In these cases as well, the same effects as those described above can be obtained.

Further, the present technique may be applied not only to printing apparatuses, but also to other devices (e.g., digital camera, personal computer, measuring instrument, clock, information device, communication device, control device, various machines, etc.) as long as it is electronic equipment provided with a touch sensor. In this case as well, the same effects as those described above can be obtained.

The processing flow is not limited to that shown in FIG. 11. For example, the processing order of the processing flow may be changed, one or more steps in the processing flow may be skipped, or any additional steps may be added without departing from the concept or scope of the invention.

Further, the components, processes, steps, and methods described in the above embodiments and their modifications may be arbitrary combined.

While the invention has been described in conjunction with various example structures outlined above and illustrated in the figures, various alternatives, modifications, variations, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An electronic apparatus comprising:
a touch sensor having a first area and a second area not overlapping with the first area;
a memory storing in advance relative position information indicating a positional relation between the first area and the second area; and
a controller configured to:
perform a first calibration process to define a first coordinate range of the first area by correcting a coordinate deviation of the first area on the basis of detection of a touch operation to touch a predetermined first target portion in the first area;
perform a second calibration process to define a second coordinate range of the second area on the basis of the first coordinate range defined in the first calibration process and the relative position information stored in the memory; and
when the second coordinate range defined in the second calibration process meets a predetermined condition, perform a third calibration process in the second area to correct the second coordinate range to cause the corrected second coordinate range not to meet the predetermined condition.

2. The electronic apparatus according to claim 1, wherein the touch sensor has a touch detection area within which the touch sensor can detect the touch operation,
wherein the predetermined condition includes at least one of:
a condition that the second coordinate range extends outside the touch detection area; and
a condition that a deviation between a coordinate range of the second area before the second calibration is performed and the second coordinate range defined in the second calibration process exceeds a predetermined threshold value.

3. The electronic apparatus according to claim 2, wherein when the second coordinate range defined in the second calibration process meets the predetermined condition, the controller performs the second calibration process to correct the second coordinate range by changing at least one of a position coordinate, a size, and an inclination of the second coordinate range to cause the corrected second coordinate range not to meet the predetermined condition.

4. The electronic apparatus according to claim 3, wherein in the third calibration process, the controller requires a touch operation to touch a second target portion in the second area and corrects the second coordinate range on the basis of detection of the resultant touch operation.

5. The electronic apparatus according to claim 4, wherein the controller is configured to further perform:
when the corrected second coordinate range corrected in the third calibration process meets the predetermined condition, a fourth calibration process to require touch operations to touch a plurality of predetermined third target portions in the second area and recorrect the second coordinate range on the basis of detections of the resultant touch operations to cause the recorrected second coordinate range not to meet the predetermined condition.

6. The electronic apparatus according to claim 1, wherein the controller is configured to further perform:
when the corrected second coordinate range does not meet the predetermined condition, a reception process to receive selection of at least one of a plurality of areas including the first area and the second area as a subject for an additional calibration process; and
the additional calibration process to correct a detected deviation of each of the selected at least one of the plurality of areas, each of areas not selected among the plurality of areas being not corrected in the additional calibration process.

7. The electronic apparatus according to claim 1, further comprising a display panel,
wherein the display panel comprises:
a first display part displaying variable contents; and
a second display part displaying fixed contents;
wherein the touch sensor includes a first opposing area opposing the first display part and a second opposing area opposing the second display part,
wherein the first area is located in the first opposing area and the second area is located in the second opposing area.

8. The electronic apparatus according to claim 1, wherein the controller does not perform the third calibration process when the second coordinate range defined in the second calibration process does not meet the predetermined condition.

9. An electronic apparatus comprising:
a touch sensor having a first area and a second area not overlapping with the first area;
a memory storing relative position information indicating a positional relation between the first area and the second area; and
a controller configured to:
perform a storing process to store in the memory a detection coordinate of a touch operation to touch a predetermined first target portion in the first area;
perform a first calibration process to define a first coordinate range of the first area by correcting a deviation of the detection coordinate;
perform a second calibration process to define a second coordinate range of the second area on the basis of the detection coordinate stored in the storing process and the relative position information stored in the memory; and
when the second coordinate range defined in the second calibration process meets a predetermined condition, perform a third calibration process in the second area to correct the second coordinate range to cause the corrected second coordinate range not to meet the predetermined condition.

10. The electronic apparatus according to claim 9, wherein the touch sensor has a touch detection area within which the touch sensor can detect the touch operation,
wherein the predetermined condition includes at least one of:
a condition that the second coordinate range extends outside the touch detection area; and
a condition that a deviation between a coordinate range of the second area before the second calibration is performed and the second coordinate range defined in the second calibration process exceeds a predetermined threshold value.

11. The electronic apparatus according to claim 10, wherein when the second coordinate range defined in the second calibration process meets the predetermined condition, the controller performs the second calibration process to correct the second coordinate range by changing at least one of a position coordinate, a size, and an inclination of the second coordinate range to cause the corrected second coordinate range not to meet the predetermined condition.

12. The electronic apparatus according to claim 11, wherein in the third calibration process, the controller requires a touch operation to touch a second target portion in the second area and corrects the second coordinate range on the basis of detection of the resultant touch operation.

13. The electronic apparatus according to claim 12, wherein the controller is configured to further perform:
when the corrected second coordinate range corrected in the third calibration process meets the predetermined condition, a fourth calibration process to require touch operations to touch a plurality of predetermined third target portions in the second area and recorrect the second coordinate range on the basis of detections of the resultant touch operations to cause the recorrected second coordinate range not to meet the predetermined condition.

14. The electronic apparatus according to claim 9, wherein the controller is configured to further perform:
when the corrected second coordinate range does not meet the predetermined condition, a reception process to receive selection of at least one of a plurality of areas including the first area and the second area as a subject for an additional calibration process; and
the additional calibration process to correct a detected deviation of each of the selected at least one of the plurality of areas, each of areas not selected among the plurality of areas being not corrected in the additional calibration process.

15. The electronic apparatus according to claim 9, further comprising a display panel,
wherein the display panel comprises:
a first display part displaying variable contents; and
a second display part displaying fixed contents;
wherein the touch sensor includes a first opposing area opposing the first display part and a second opposing area not opposing the second display part,
wherein the first area is located in the first opposing area and the second area is located in the second opposing area.

16. The electronic apparatus according to claim 9, wherein the controller does not perform the third calibration process when the second coordinate range defined in the second calibration process does not meet the predetermined condition.

17. A non-transitory computer readable storage medium storing a set of program instructions installed on and executed by a computer for controlling an electronic apparatus including a touch sensor having a first area and a second area not overlapping with the first area, and a memory storing in advance relative position information indicating a positional relation between the first area and the second area, the set of program instructions comprising:
performing a first calibration process to define a first coordinate range of the first area by correcting a coordinate deviation of the first area on the basis of detection of a touch operation to touch a predetermined first target portion in the first area;

performing a second calibration process to define a second coordinate range of the second area on the basis of the first coordinate range defined in the first calibration process and the relative position information stored in the memory; and when the second coordinate range defined in the second calibration process meets a predetermined condition, performing a third calibration process in the second area to correct the second coordinate range to cause the corrected second coordinate range not to meet the predetermined condition.

\* \* \* \* \*